United States Patent [19]
Soumiya et al.

[11] Patent Number: 5,696,764
[45] Date of Patent: Dec. 9, 1997

[54] ATM EXCHANGE FOR MONITORING CONGESTION AND ALLOCATING AND TRANSMITTING BANDWIDTH-GUARANTEED AND NON-BANDWIDTH-GUARANTEED CONNECTION CALLS

[75] Inventors: Toshio Soumiya; Naotoshi Watanabe; Masafumi Katoh; Takashi Hatano; Satoshi Kakuma, all of Kawasaki, Japan

[73] Assignee: Fujitsu Limited, Kanagawa, Japan

[21] Appl. No.: 403,907

[22] PCT Filed: Jul. 21, 1994

[86] PCT No.: PCT/JP94/01199

§ 371 Date: Apr. 13, 1995

§ 102(e) Date: Apr. 13, 1995

[87] PCT Pub. No.: WO95/03657

PCT Pub. Date: Feb. 2, 1995

[30] Foreign Application Priority Data

Jul. 21, 1993 [JP] Japan .................. 5-180214

[51] Int. Cl.[6] .................................................. H04J 3/24
[52] U.S. Cl. .................. 370/395; 370/437; 370/443; 370/445
[58] Field of Search .............. 370/60.1, 60, 85.2, 370/85.6, 94.1, 94.2, 95.1, 352, 422, 445, 389, 394, 443, 444, 395, 233, 437

[56] References Cited

U.S. PATENT DOCUMENTS

| | | | |
|---|---|---|---|
| 4,550,397 | 10/1985 | Turner et al. | 370/60 |
| 4,769,810 | 9/1988 | Eckberg, Jr. et al. | 370/60 |
| 4,769,811 | 9/1988 | Eckberg, Jr. et al. | 370/60 |
| 4,817,082 | 3/1989 | Orsic | 370/58 |
| 4,849,968 | 7/1989 | Turner | 370/94 |
| 4,912,702 | 3/1990 | Verbiest | 370/84 |
| 4,984,264 | 1/1991 | Katsube | 379/197 |
| 4,993,018 | 2/1991 | Hajikano et al. | 370/60 |
| 5,020,052 | 5/1991 | DePrycker et al. | 370/60 |
| 5,020,055 | 5/1991 | May, Jr. | 370/94.1 |
| 5,062,106 | 10/1991 | Yamazaki et al. | 370/94.1 |
| 5,070,498 | 12/1991 | Kakuma et al. | 370/60 |

(List continued on next page.)

FOREIGN PATENT DOCUMENTS

| | | | |
|---|---|---|---|
| 55-8132 | 1/1980 | Japan | H04L 11/20 |
| 3-101339 | 4/1991 | Japan | H04L 12/48 |
| 3-267847 | 11/1991 | Japan | H04L 12/48 |
| 4-336832 | 11/1992 | Japan | H04L 12/48 |

OTHER PUBLICATIONS

I. Habib et al., "Controlling Flow and Avoiding Congestion in Broadband Networks", IEEE Communications, vol. 29, No. 10, (Oct. '91), pp. 46–53, particularly refer to line 40–52, right col. on p. 50.

T. Soumiya et al., "A Study on the Characteristics of Bursty Traffic in ATM Switching Modules", IEICE, vol. 92, No. 348, SSE92–88, Nov. '92, pp. 31–36, particularly refer to Fig. 2(a).

*Primary Examiner*—Douglas W. Olms
*Assistant Examiner*—Shick Hom
*Attorney, Agent, or Firm*—Helfgott & Karas, P.C.

[57] ABSTRACT

An ATM including both a bandwidth-guaranteed connection call and a non-bandwidth-guaranteed connection call together, with respect to the bandwidth-guaranteed connection call, a scheduler 21 allocates the number of time slots which correspond to a required bandwidth to the bandwidth-guaranteed connection call from among the N time slots which constitute one period and so controls as to transmit an ATM cell at an allocated time slot. A non-bandwidth-guaranteed cell transmitting element 31 transmits an ATM cell of a non-bandwidth-guaranteed connection call at a time slot which is not allocated at any bandwidth-guaranteed connection call. A congestion/normal state monitoring element 121 sets in advance a queue length which is regarded as the occurrence of a long-term congestion in a queuing buffer 111, and compares the actual queue length with the preset queue length so as to detect the occurrence of a long-term congestion.

13 Claims, 27 Drawing Sheets

U.S. PATENT DOCUMENTS

| | | | |
|---|---|---|---|
| 5,084,867 | 1/1992 | Tachibana et al. | 370/60 |
| 5,132,966 | 7/1992 | Hayano et al. | 370/79 |
| 5,164,938 | 11/1992 | Jurkevich et al. | 370/60.1 |
| 5,166,894 | 11/1992 | Saito | 364/715.01 |
| 5,179,557 | 1/1993 | Kudo | 370/94.1 |
| 5,231,633 | 7/1993 | Hluchyj et al. | 370/94.1 |
| 5,233,606 | 8/1993 | Pashan et al. | 370/85.6 |
| 5,267,232 | 11/1993 | Katsube et al. | 370/17 |
| 5,280,483 | 1/1994 | Kamoi et al. | 370/94.1 |
| 5,335,222 | 8/1994 | Kamoi et al. | 370/60 |
| 5,390,176 | 2/1995 | Schoute et al. | 370/60.1 |
| 5,390,184 | 2/1995 | Morris | 370/60 |
| 5,392,280 | 2/1995 | Zheng | 370/94.2 |
| 5,394,396 | 2/1995 | Yoshimura et al. | 370/60 |
| 5,446,735 | 8/1995 | Tobagi et al. | 370/85.3 |

FIG.5

| | |
|---|---|
| $T_1$ | #1 |
| $T_2$ | #2 |
| $T_3$ | #3 |
| $T_4$ | VACANT |
| $T_5$ | #n |
| $T_6$ | #1 |
| $T_7$ | #2 |
| $T_8$ | VACANT |
| $T_M$ | ⋮ |

FIG.6

| | |
|---|---|
| #1 | |
| #2 | |
| #3 | |
| VACANT (USABLE) | — SOK |
| #n | |
| #1 | |
| #2 | |
| VACANT (NOT USABLE) | — SNO |
| ⋮ | |

WHEN THERE IS NO INFORMATION FRAME LOSS

ATM EXCHANGE FOR MONITORING CONGESTION AND ALLOCATING AND TRANSMITTING BANDWIDTH-GUARANTEED AND NON-BANDWIDTH-GUARANTEED CONNECTION CALLS

TECHNICAL FIELD

The present invention relates to an ATM exchange and, more particularly, to an ATM exchange which is capable of maintaining a required QOS (quality of service) and which is capable of detecting a long-term congestion and avoiding the congestion in a case where there are simultaneously both a bandwidth-guaranteed connection call and a non-bandwidth-guaranteed connection call.

BACKGROUND ART

There is increasing demand not only for audio communication and data communication but also for multimedia communication in which moving pictures are transmitted as well as audio and data. As a means for realizing such broadband communication, an agreement has been reached upon an exchanging technique in a B-ISDN (Broadband-ISDN) system, which is based on an asynchronous transfer mode (ATM), and the technique is being put to practical use.

In the ATM, all the information is converted into fixed information which is called a cell without depending upon continuous information such as an audio and a moving picture or burst information such as data, and transferred at high speed without depending upon the respective communication speed. More specifically, in the ATM, a line is allocated to a plurality of calls by establishing a multiplicity of logical links on a physical line. The moving picture data and the audio data transmitted from a terminal corresponding to each call are separated into information units (which are called cells) having a fixed length, and the cells are serially transmitted over a line, thereby realizing multiplex communication.

Each cell is composed of a block having a fixed length of 53 bytes, as shown in FIG. 19. In the 53 bytes, 5 bytes constitute a header portion HD and 48 bytes an information field (information portion) DT. The header portion HD includes a virtual channel identifier (VCI) for identifying a call so as to indicate the destination even after the data is separated into blocks. The header portion HD also includes a virtual path identifier (VPI) for specifying a path, a generic flow control (GFC) which is used for flow control between links, a payload type (PT), a header error control (HEC) for correcting errors, etc.

(a) ATM Network

FIG. 20 schematically shows the structure of an ATM network so as to explain ATM transmission. In FIG. 20, the reference numerals 1a, 1b represent ATM terminals, and 3 an ATM network. The ATM network 3 is provided with an information network 3a for transferring a data cell, and a signal network 3b for transferring a control signal. The call processing processor units (CPUs) 3d-1 to 3d-n of the ATM exchanges 3c-1 to 3c-n in the information network 3a are connected to the signal network 3b.

When the originating terminal 1a executes a calling operation so as to call the terminating terminal 1b, the cell assembling portion of the originating terminal separates the SET UP message (data which includes the originating number, the terminating number, the type of terminal, the average cell rate, the peak cell rate, etc.) into cell units, attaches a signal VCI (which is determined in advance for the respective terminal) to each divided data to form a signaling cell and supplies the signaling cell to the ATM network 3.

When the signaling device of the ATM exchange 3c-1 (on the originating side) receives the signaling cell, it assembles the information contained in the signaling cell and supplies the assembled information to the CPU 3d-1. On the basis of the received message, the CPU executes calling such processing as processing for analyzing calling-party service, billing processing, processing for interpreting digits on the side of the terminating party, etc., determines a path (VPI) and a virtual channel identifier (VCI), and in accordance with a protocol No. 7, supplies connection information which includes data such as the originating number, terminating number, VPI and VCI, to the subsequent relay exchange 3c-2 via the signal network 3b. The relay exchange 3c-2 executes similar processing to that of the exchange 3c-1 on the originating side. After repetition of similar processing, the paths and the relay ATM exchanges 3c-2, 3c-3, . . . between the exchange 3c-1 on the originating side and the ATM exchange 3c-n to which the terminating terminal 1b is connected are finally determined. When the ATM exchange 3c-n on the terminating side receives the connection information including the originating number, the terminating number and the VCI of the higher-order ATM exchange 3c-3, the ATM exchange 3c-n allocates a predetermined VCI to the terminating terminal 1b and judges whether or not the terminating terminal 1b is communicable. If the answer is YES, the signal network 3b informs the exchange 3c-1 on the originating side that the terminating terminal 1b is communicable, and the exchange 3c-1 on the originating side allocates a predetermined VCI to the originating terminal 1a.

Each of the ATM exchanges 3c-1 to 3c-n on each path registers the following into an internal routing table in a form correlated with the VCI of the higher-order ATM exchange:

(1) a tag which includes the routing information for specifying outgoing highway (output link) of the cell having the particular VCI and the information for maintaining the quality, and (2) new VCI and VPI which are to be added to the output cell in place of the old VCI and VPI.

In this manner, when the paths are formed between the originating terminal 1a and the terminating terminal 1b, these terminals 1a, 1b transmit and receive the call cells and the response cells and confirm the communication procedure in mutual fashion. Thereafter, the originating terminal 1a separates the data to be transmitted into predetermined byte lengths, generates a cell with a header including the allocated VCI attached thereto, and supplies the cell to the ATM network 3. When the cell is input from the higher-order exchange through a predetermined incoming highway, each of the ATM exchanges 3c-1 to 3c-n replaces the VPI/VCI of the input cell by reference to its routing table and sends the cell out on a predetermined outgoing highway on the basis of the tag (routing information). As a result, the cell output from the originating terminal 1a reaches the exchange 3c-n on the terminating side via the paths determined by the call control. The exchange 3c-n on the terminating side replaces the VCI which is attached to the input cell with the VCI allocated to the terminating terminal 1b by reference to its routing table and supplies the cell to the line to which the terminating terminal 1b is connected.

Thereafter, the originating terminal 1a serially transmits the cells to the terminating terminal 1b, and the terminating terminal 1b assembles the information portion DT contained in the received cells and restores the original data.

In the above explanation, only one call is processed, but by providing different VCI values for both ends of the respective lines between a terminal and an ATM exchange and between mutually adjacent ATM exchanges, it is possible to establish logical links on one line in correspondence with a multiplicity of calls, thereby realizing high-speed multiplex communication. According to the ATM, it is possible to multiplex information from information sources having different transmission speeds such as moving pictures, data and audio, so that a single transmission line can be effectively used. In addition, data transmission at a very high speed on the order of 150 Mbps to 600 Mbps is enabled without the need for retransmission control or a complicated communication procedure which is conventionally implemented by software through packet switching.

An ATM exchange has a buffering function, which enables the ATM exchange to accept a call without keeping the originating terminal waiting and to send it to the terminating terminal even if there are a multiplicity of calls to the ATM exchange or the terminating terminal. For example, when there are a multiplicity of simultaneous calls to the terminating terminal 1b and therefore there is no vacant line between the exchange 3c-n on the terminating side and the terminating terminal 1b, there remains a cell which cannot be sent to the terminating terminal 1b. In this case, the exchange 3c-n on the terminating side buffers the remaining cell and sends it to the terminating terminal 1b when a line becomes vacant. In this manner, it is possible to accept a call to the terminating terminal without keeping the originating terminal waiting.

(b) Self-Routing ATM Exchange

FIG. 21 shows the structure of a self-routing ATM exchange. The self-routing ATM exchange is provided with a basic switching unit SWU, a control information add-on unit CIAU, and a CPU (call controller) for processing a calling. Although one self-routing switch module SRM 1 exists between the input lines and the output lines in this ATM exchange, a plurality of self-routing switch modules may be connected between them.

The input ends of the module SRM 1 are connected to the input lines (input links) #1 to #3 via the control information add-on unit CIAU, and the output ends are connected to the output lines (output links) #1 to #3. The control information add-on unit CIAU is provided with add-on circuits AC1 to AC3 for adding routing information or the like in correspondence with the respective input lines #1 to #3. Each of the add-on circuits AC1 to AC3 adds a tag (routing header) to the cell which is input from the corresponding input line, replaces the VCI contained in the cell information and supplies the cell to the basic switching unit SWU.

The call controller CPU controls a call so as to determine the VCI and the VPI of a cell at the time of calling, determines the tag (routing header RH) in accordance with the location of the terminating terminal and writes the control information (VPI, VCI, RH) in a routing table (not shown) of the add-on circuit to which the cell is input. When the cell is input to a predetermined input line via the higher-order ATM exchange after the end of the call control, one of the add-on circuit AC1 to AC3 which is connected to the input line reads, from the routing table, the control information (tag and VCI) which corresponds to the VCI attached to the input cell. The add-on circuit adds the tag (routing header RH) to the cell, replaces the VCI of the cell with the read VCI, and supplies the cell to the basic switching unit SWU. The self-routing switch module SRM 1 of the basic switching unit SWU transmits the cells from a predetermined output line in accordance with the tag (routing header RH).

FIG. 22 is a circuit diagram of an example of the self-routing switch module (SRM 1). The symbols $I_1$ to $I_3$ represent control information detectors, $D_1$ to $D_3$ transmission information delay circuits, $DM_1$ to $DM_3$ demultiplexers, and $DEC_1$ to $DEC_3$ control information decoders. All these elements constitute a cell distributor CELD. The symbols $FM_{11}$ to $FM_{33}$ represent buffer memories such as FIFO (First-In First-Out) memories, $SEL_1$ to $SEL_3$ selectors, and $AOM_1$ to $AOM_3$ arrival-order management FIFOs. The arrival-order management FIFOs ($AOM_1$ to $AOM_3$), which are connected to the output ends of the control information decoders $DEC_1$ to $DEC_3$, respectively, store the order of arrival of the cells into the corresponding three buffer memories $FM_{11}$ to $FM_{13}$, $FM_{21}$ to $FM_{23}$ and $FM_{31}$ to $FM_{33}$, respectively, control the selectors $SEL_1$ to $SEL_3$, respectively, so as to read the cells from the buffer memories in the order of arrival, and supply the cells to the output lines #1 to #3, respectively.

The detector $I_i$ (i=1 to 3) extracts the control information contained in the cell and supplies the information to the decoder $DEC_i$ (i=1 to 3).

If the input tag (routing header RH) represents the output terminal #j (j=1 to 3), the decoder $DEC_i$ operates the demultiplexer $DM_i$ by a switch signal $S_i$ and transmits the transmission information to the FIFO memory $FM_{ji}$. For example, if the routing header RH contained in the information input from the input terminal #1 represents the output terminal #2, the decoder $DEC_1$ operates the demultiplexer $DM_1$ and inputs the information supplied from the input terminal #1 to the FIFO memory $FM_{21}$. The arrival-order management FIFO ($AOM_i$) is connected to the output terminal of the corresponding control information decoder $DEC_1$ to $DEC_3$ and stores the order of arrival of the cells to the corresponding three buffer memories $FM_{i1}$ to $FM_{i3}$. For example, if the cells arrive to the buffer memories in the order of $FM_{11}$, $FM_{12}$, $FM_{13}$, $FM_{12}$, ..., buffer memory identification codes 1, 2, 3, 2, ... are stored in the arrival-order management FIFO ($AOM_i$) in the order of arrival of the cells. Thereafter, the arrival—order management FIFO ($AOM_i$) controls the corresponding selector $SEL_i$ to read the cells from the three buffer memories $FM_{i1}$ to $FM_{i3}$ in the order of arrival of the cells and supplies the cells to the output line #i.

In this manner, since the FIFO memory $FM_{ij}$ has a capacity for a plurality of cells, it has a buffering function which is capable of adequately dealing with the problem such as a temporary increase of transmission data. In addition, since cells are read from the buffer memories $FM_{i1}$ to $FM_{i3}$ in the order of arrival of the cells, an equal number of cells remain in each of the buffer memories $FM_{i1}$ to $FM_{i3}$, and it never happens that cells overflow a buffer memory and are therefore discarded.

The ATM transmission system, however, has the following problem. Since various traffics having different information speeds and different burst properties (burst means an abrupt increase in the quantity of information) are synthetically handled in the ATM transmission system, in a case where there is a traffic having an especially strong burst property, it is impossible without an appropriate call reception control to transmit the ATM cells so as to satisfy a QOS (cell loss ratio, delay time) which is required by the user. For this reason, when a bandwidth-guaranteed connection call generates, an ATM exchange judges whether or not there is a vacant bandwidth which the call requires in a predetermined transmission line on the basis of the physical bandwidth of the transmission line and the average and peak cell rates of the call declared by the user (ATM terminal), and if the answer is in the affirmative, the ATM exchange accepts the call, while rejecting the call if the answer is in the negative.

There are two methods for determining whether the ATM exchange accepts or rejects a call having a variable-speed traffic property in which the average cell rate is different from the peak cell rate. In the first method, the ATM exchange determines whether or not the call is accepted by regarding the peak cell rate of the call as a necessary bandwidth. The first method is simple, but it reduces the number of calls which can be allocated to a transmission line, thereby lowering the utilization of a transmission line. In the second method, the ATM exchange determines whether or not the call is accepted by regarding the average cell rate of the call as a necessary bandwidth. According to the second method, many calls can be allocated to a transmission line, thereby enhancing the utilization of a transmission line. However, when the peak of the transmission rate for each call overlaps each other, cells beyond the physical bandwidth of the transmission line are lost. As a result, it is impossible to meet the required cell loss ratio, which causes sound skipping, picture missing and data loss on the terminating side. In order to solve these problems, cells are allocated both on the basis of average cell rate and on the basis of the peak cell rate in the call reception control adopted at present, thereby enhancing the utilization of a transmission line while maintaining a predetermined cell loss ratio.

FIG. 23 is an explanatory view of the call reception control in an ATM exchange. In FIG. 23, (1) the reference symbol Vt represents the physical bandwidth of a transmission line, (2) Vpht the sum of the peak cell rates of all the calls allocated on the basis of the peak cell rate, (3) Vavt the sum of the average cell rates of all the calls allocated on the basis of the average cell rate, and (4) Vpts the sum of the peak cell rates of all the cells that are in the process of communication. Further, (5) the reference symbol Vp represents the peak cell rate of a new call (which is requesting admission), and (6) Vav the average cell rate of the call which is requesting admission.

When the number of calls allocated to the transmission line increases, the peaks and the bottoms of the transmission rates overlap each other and they are levelled due to a statistical multiplexing efficiency, so that it is possible to accommodate a larger number calls than an apparent number of calls. In call reception control referred to as connection admission control (CAC), cells are allocated on the basis of both the average cell rate and the peak cell rate by utilizing such a statistical multiplexing efficiency.

(c) Statistical Multiplex System

In an ATM exchange, the ATM cells which arrive from a plurality of (N) input links are concentrated and multiplexed before being transmitted from a predetermined output link, as shown in FIG. 24. As such a concentration multiplex system, there are ① a cross-point buffer system by skip polling control, ② a cross-point buffer system by FIFO read control, ③ a cross-point buffer system by LNQ priority read control, and ④ an output buffer system.

In the cross-point buffer system by the skip polling control, the buffers (buffers $FM_{11}$ to $FM_{33}$ shown in FIG. 22) are serially scanned and ATM cells are transmitted, while a vacant buffer is skipped. In the cross-point buffer system by the FIFO read control, the order of arrival of the ATM cells from all input links is collectively managed and the ATM cells are serially transmitted in the order of arrival, as explained in FIG. 22. In the cross-point buffer system by the LNQ priority read control, an ATM cell is read preferentially from the buffer in which the largest number of cells are stored. The LNQ is an abbreviation of Largest Number of Cells in the Queue. These cross-point buffer systems are premised on that scanning of all the buffers or comparison of the number of cells stored in the buffers can be executed within one cell reading time.

In the output buffer system, cells are multiplexed so that the speed is temporarily raised to N·V in the ATM exchange, thereafter the speed N·V is converted to the speed V (N·V→V) by a single FIFO. FIG. 25 explains such an output buffer system. The symbol MPX represents a multiplexer, and $DBF_1$ to $DBF_N$ FIFO memories as output buffers. The multiplexer MPX multiplexes the cells for output lines #1 to #N having a speed of V, and stores the multiplexed cells in the output buffers $DBF_1$ to $DBF_N$ provided in correspondence with the respective output lines #1 to #N at a speed of NV. Then, the cells are read from the respective buffers at the speed of V and output to the corresponding output lines #1 to #N.

These concentration multiplex systems ①-④ will be compared with each other in the following.

(1) In regard to the buffer lengths required in the case of random traffic input, the systems ④, ③, ②, ① require a shorter buffer length in that order.

(2) With the fact that the output buffer system ④ requires a high-speed memory having a speed of N times of V taken into consideration, the memory costs in each system is represented by the following formula, $$\text{memory cost} = \sqrt{(N \cdot \text{buffer length})} \ .$$

Therefore, in regard to the memory costs, the systems ③, ②, ④, ① require a lower cost in that order.

(3) In the case of burst input, there is a knee point at which the cell loss ratio is not reduced however longer the buffer length may be. Due to this influence, there is not much difference as to the cell loss ratio if the buffer length is long. FIG. 26 shows the relationship between the logarithm of the cell loss ratio represented by log[cell loss ratio] and the buffer length, wherein the symbol n represents the number of multiplexed calls, and Vout the speed of a transmission line. As is clear from FIG. 26, the larger the number n of multiplexed calls becomes, the knee point moves downward, so that the cell loss ratio is reduced. This is because the larger the number n of multiplexed calls becomes, the more peaks and bottoms of the transmission speeds for the multiplexed calls overlap with each other due to a statistical multiplexing efficiency thereby the transmission speed of each call is leveled.

(4) In order to lower the knee point in the case of burst input, it is necessary to increase the transmission speed at the output link in comparison to the peak cell fate, which leads to an increase in the multiplex degree.

In the future, the peak cell rate of the calling source itself will increase. This means that in order to lower the knee point, it is necessary to enhance the speed of the resource of a network for multiplexing the calls. Therefore, the output buffer system ④ which is primarily required to memorize the cells at high speed and therefore has no margin in the speed should not be adopted.

Although the cross-point buffer system by the LNQ priority read control ④ is superior to any other cross-point buffer system in the point of the cell loss ratio, it should not be adopted either because it has the following defects;

the embodiment of the mechanism itself is difficult, and since a buffer in which the smallest number of cells are stored has a possibility of continuously losing the priority and the delay time of the cell may be increased, control using a threshold is essential.

Consequently, the cross-point buffer system by FIFO read control is the most realistic as a system for transmitting the ATM cells queued in buffers to an output link.

When such statistical multiplex is executed, the utilization of an output link is enhanced. However, there is a possibility of one connection continuously occupying the bandwidth of the output link, and it is impossible to desirably allocate a bandwidth for each connection or each input link.

(d) Traffic Shaping System

In contrast to the statistical multiplex system, there is a traffic shaping system as a method of desirably allocating a bandwidth for each connection or each input link. FIG. 27 shows the structure of a traffic shaping system. In the traffic shaping system, the physical bandwidth V (e.g., V=150 Mb/s) of one output link is divided suitably and each divided bandwidth is allocated in advance to each input link, and the ATM cells input from each input link is transmitted to the output link so as to satisfy the allocated bandwidth. According to the traffic shaping system, by managing the bandwidth to be used in the output link for each input link, it is possible to prevent a phenomenon that such a greater part of the bandwidth of the output link is occupied by a specific connection as to make it impossible to transmit the cells of the other connections. In FIG. 27, the symbol CELD represents a cell distributor (see CELD in FIG. 22), FM11 to FM1n FIFO buffers provided in correspondence with input links, SEL a selector, and a SCD a scheduler for reading an ATM cell from each buffer in accordance with a preset schedule and transmitting it to the output link #1. In the scheduling table within the scheduler SCD, for example, one period is divided into 128 cell slots (time slots) and each of the cell slots $S_1$ to $S_{128}$ is allocated to a buffer (input link) from which cells are read and supplied to the output link. Accordingly, at every one of the 128 cell slots of one period, the scheduler reads a cell from a predetermined buffer and supplies it to the output link. This operation is conducted cyclically. By this operation, a bandwidth V1, V2, . . . Vn (V1+V2+. . . Vn≦V) is allocated to each input link. When the number of cells supplied from a buffer in one period is a plural, it is preferable to make the interval between cells as uniform as possible.

As described above, according to a traffic shaping system, the bandwidth allocated to each input link becomes desirable. However, in contrast to a statistical multiplex system, even if there is a buffer in which more cells arrive and an output link is vacant, it is inconveniently impossible to read a cell from the buffer and supply it to the output link until the time for accessing the buffer comes. In other words, the utilization of an output link is not very high in a traffic shaping system.

(e) Congestion

In an ATM network, cell loss, that is, a loss of transmission information is caused by simultaneous arrival of cells to a buffer (short time congestion). In the case of relaying between high-speed data communication networks such as frame relay networks by an ATM network, a frame, which is an information transmission unit of a high-speed data communication network, sometimes becomes incomplete (an error frame is generated) due to the cell loss in the ATM network. The error frame is complemented by retransmission control in dependence upon the higher-order protocols of the terminal. At this time, there is a fear of an increase in the load on the ATM network, which furthers and deteriorates the congestion in the ATM network, resulting in a long-term congestion, depending upon the connection form between the high-speed data communication network and the ATM network or the retransmission control of the higher-order protocols.

FIG. 28 is an explanatory view of a short-time congestion and a long-term congestion. The abscissa represents time and the ordinate the length (queue length) of the cells stored in a queue in a buffer. The symbol CTH represents a congestion threshold for detecting a congestion. A short-term congestion SCJ is caused when the buffer queue length is momentarily increased, and it is autonomously relieved. On the other hand, in a long-term congestion LCJ, the buffer queue length is held at its maximum. When the congestion threshold CTH is equal to the buffer size, all the cells above the dot line are lost.

FIGS. 29 and 30 are explanatory views of retransmission control, wherein FIG. 29 shows retransmission control when there is no frame loss, and FIG. 30 shows retransmission control when there is frame loss. In these drawings, the retransmission process of data communication is exemplified by a Go-Back-N process (HLDC process), which is the most general as a data communication retransmission process. In the Go-Back-N process, after a sequence number is attached to each frame, flow control of each frame or retransmission control is executed. Each frame is provided with a field for recording the sequence number of a received frame so as to acknowledge the arrival of the frame (acknowledge normal communication). More specifically, the terminating side records the sequence number of the latest one of the consecutively normally received frames in a frame which is transmitted in the reverse direction (from the terminating side to the originating side) and acknowledges the arrival of the frames between the terminating side and the originating side (see ACK (2) and ACK (4) in FIG. 29). A frame loss is detected from the discontinuity of sequence numbers of the received frames (see FIG. 30). Similarly, it is general that the sequence number of a lost frame is notified to the originating side by a frame transmitted in the reverse direction (see REJ (2), the numeral 2 is a sequence number of the lost frame).

In the Go-Back-N process, the originating which has received the report REJ (2) of the sequence number of the lost frame retransmits all the frames subsequent to the lost frame which is indicated by the supplied lost frame sequence number (=2), as shown in FIG. 30. This is because the terminating side regards all the transmitted frames subsequent to the lost frame as invalid, and discards them. Consequently, even if there is only one frame loss, the number of retransmitted frames is a plural, so that when a plurality of lines execute a retransmission process, the congestion is deteriorated due to an increase in the load, which may result in a long-term congestion.

(f) Problems in Statistical Multiplex System and Traffic Shaping System and Objects of the Invention According to a statistical multiplex system, the utilization of an output link is enhanced. However, there is a possibility of one connection continuously occupying the bandwidth of the output link, and it is impossible to desirably allocate a bandwidth for each connection or each input link. In contrast, in a traffic shaping system, although it is possible to desirably allocate a bandwidth for each input link, the utilization of an output link is not very high. In this way, both statistical multiplex system and a traffic shaping system have respective merits and defects. An ATM exchange having the merits of both system by utilizing both systems is therefore demanded.

There are two types of call; one is a bandwidth-guaranteed connection call which requires a bandwidth to be guaranteed, and the other is a non-bandwidth-guaranteed connection call which does not require a bandwidth to be guaranteed and a cell of which may be transmitted only when no information of a bandwidth-guaranteed connection call is transmitted. When there are these two types of call together, it is desirable to decisively allocate the required bandwidth to the bandwidth-guaranteed connection call and to allow the non-bandwidth-guaranteed connection call to effectively use the remaining bandwidth.

Accordingly, it is a first object of the present invention to provide an ATM exchange which utilizes both a statistical multiplex system and a traffic shaping system to have the respective merits.

It is a second object of the present invention to provide an ATM exchange for transmitting the cell of a bandwidth-guaranteed connection call to an output link in accordance with a traffic shaping system and for transmitting the cell of a non-bandwidth-guaranteed connection call to the output link in accordance with a statistical multiplex system, for example, a cross-point buffer system by FIFO read control when there are simultaneously both the bandwidth-guaranteed connection call and the non-bandwidth-guaranteed connection call.

It is a third object of the present invention to provide an ATM exchange which is capable of decisively allocating a bandwidth to each bandwidth-guaranteed connection call.

It is a fourth object of the present invention to provide an ATM exchange which is capable of regulating the bandwidth to be allocated to a non-bandwidth-guaranteed connection call.

It is a fifth object of the present invention to provide an ATM exchange which is capable of decisively allocating a bandwidth to a bandwidth-guaranteed connection call, wherein the bandwidth is necessary for satisfying the quality specified by a quality class to which the bandwidth-guaranteed connection call belongs.

It is a sixth object of the present invention to provide an ATM exchange which is capable of acquiring a necessary bandwidth for a bandwidth-guaranteed connection call even if ATM cells of a non-bandwidth-guaranteed connection call frequently reach.

It is a seventh object of the present invention to provide an ATM exchange which is capable of acquiring a bandwidth so as to securely maintain the qualities of all the quality classes even if many ATM cells of a specific quality class reach, by inhibiting a bandwidth beyond the bandwidth in conformity with cell loss ratio which is specified for each quality class from being allocated to each quality class.

(g) Problems of Long-Term Congestion and Objects of the Invention

Although a short-term congestion is autonomously relieved, the buffer queue length is held at its maximum and cell loss is caused for a long term in a long-term congestion. It is therefore necessary to exert congestion control so as to avoid a long-term congestion when the long-term congestion is detected and to release the congestion avoiding control when a normal state is restored.

As a method of detecting a congestion, there is a system of detecting a congestion by using the number of lost cells or a cell loss ratio. This system is advantageous in that it does not depend upon the form of the information which flows into a buffer, but it is defective in that since it requires a special hardware for observing the cells lost for a short period, it increases a hardware in an ATM exchange and therefore makes the ATM exchange complicated.

As a system which is realized by a simple hardware, there is a system of setting a threshold of the buffer queue length and detecting and judging a congestion merely by taking whether the buffer queue length becomes lager than the threshold of the buffer queue length into consideration. In this simple system, however, there is a difficult problem. That is, it is necessary to take the form of information which flows into the buffer into consideration when the threshold is determined. More specifically, if the information which flows into the buffer has a strong burst property, although the average queue length is small, the fluctuation (dispersion) in the vicinity of the average value is large, so that there is a case where the queue length momentarily exceeds the threshold, which inconveniently leads to excessive and frequent the congestion avoiding control.

It is therefore conventionally impossible to securely detect a long-term congestion discriminated from a short-term congestion by a simple structure.

Accordingly, it is an eighth object of the present invention to provide an ATM exchange which is capable of securely detecting a long-term congestion discriminated from a short-term congestion by a simple structure and starting congestion avoiding control.

It is a ninth object of the present invention to provide an ATM exchange which is capable of securely detecting that the ATM exchange network has restored a normal state from a long-term congestion so as to quickly release congestion avoiding control.

It is a tenth object of the present invention to provide an ATM exchange which is capable of obviating the difficulty in determining a threshold with the form of information flowing into a buffer taken into consideration.

It is an eleventh object of the present invention to provide an ATM exchange which is capable of avoiding an oscillation phenomenon that the operation of starting and ending congestion avoiding control is frequently repeated.

DISCLOSURE OF THE INVENTION

To achieve these objects, the present invention provides an ATM exchange for transmitting ATM cells which arrive from an input link to a predetermined output link and for controlling the transmission of the ATM cells in the following manner in a case where there are simultaneously both a bandwidth-guaranteed connection call which requires a bandwidth to be guaranteed, and a non-bandwidth-guaranteed connection call which does not require a bandwidth to be guaranteed and a cell of which may be transmitted only when no information of the bandwidth-guaranteed connection call is transmitted. With respect to the bandwidth-guaranteed connection call, a scheduler allocates the predetermined number of time slots which correspond to the required bandwidth to the bandwidth-guaranteed connection call from among the N time slots which constitute one period, and transmits an ATM cell of the bandwidth-guaranteed connection call at each allocated time slot. A non-bandwidth-guaranteed cell transmitting means transmits ATM cells of the non-bandwidth-guaranteed connection call at time slots which are not allocated to any bandwidth-guaranteed connection call. In this manner, an ATM exchange can exchange the ATM cells by utilizing both a statistical multiplex system and a traffic shaping system so as to have the respective merits. In other words, by decisively allocating a necessary bandwidth to a bandwidth-guaranteed connection call which is required to have a predetermined QOS, it is possible to transmit ATM cells having such a quality to an output link. On the other hand, it is possible to transmit ATM cells of a non-bandwidth-guaranteed connection call to the output link in such a manner as to enhance the utilization of the output link.

The ATM exchange is provided with a queuing buffer for storing cells in a queue which arrive in the ATM exchange in correspondence with output links and serially transmitting the queued cells to the corresponding output links, and a congestion/normal state monitoring means for detecting the occurrence of a long-term congestion which is different from a short-term congestion due to simultaneous arrival of cells in a normal state, and judging whether or not the normal state is restored from the congestion under congestion avoiding control. The congestion/normal state monitoring means presets in advance a buffer queue length which is regarded as the occurrence of a long-term congestion and compares the actual queue length with the preset queue length so as to detect the occurrence of a long-term congestion. In this manner, it is possible to detect a long-term congestion distinguished from a short-term congestion and quickly restore a normal state by exerting congestion avoiding control. In addition, it is possible to avoid an oscillation phenomenon that the operations of starting and ending congestion avoiding control are frequently repeated by inhibiting control for ending congestion avoiding control for a predetermined time after the start of the congestion avoiding control.

BRIEF DESCRIPTION OF THE DRAWINGS

FIG. 5 is an explanatory view of a scheduling table;

FIG. 6 is an explanatory view of another scheduling table;

BEST MODE FOR CARRYING OUT THE INVENTION (A) Summary of the Invention

FIGS. 1 (a) and (b) are a schematic explanatory view of the present invention.

Figure 1A:
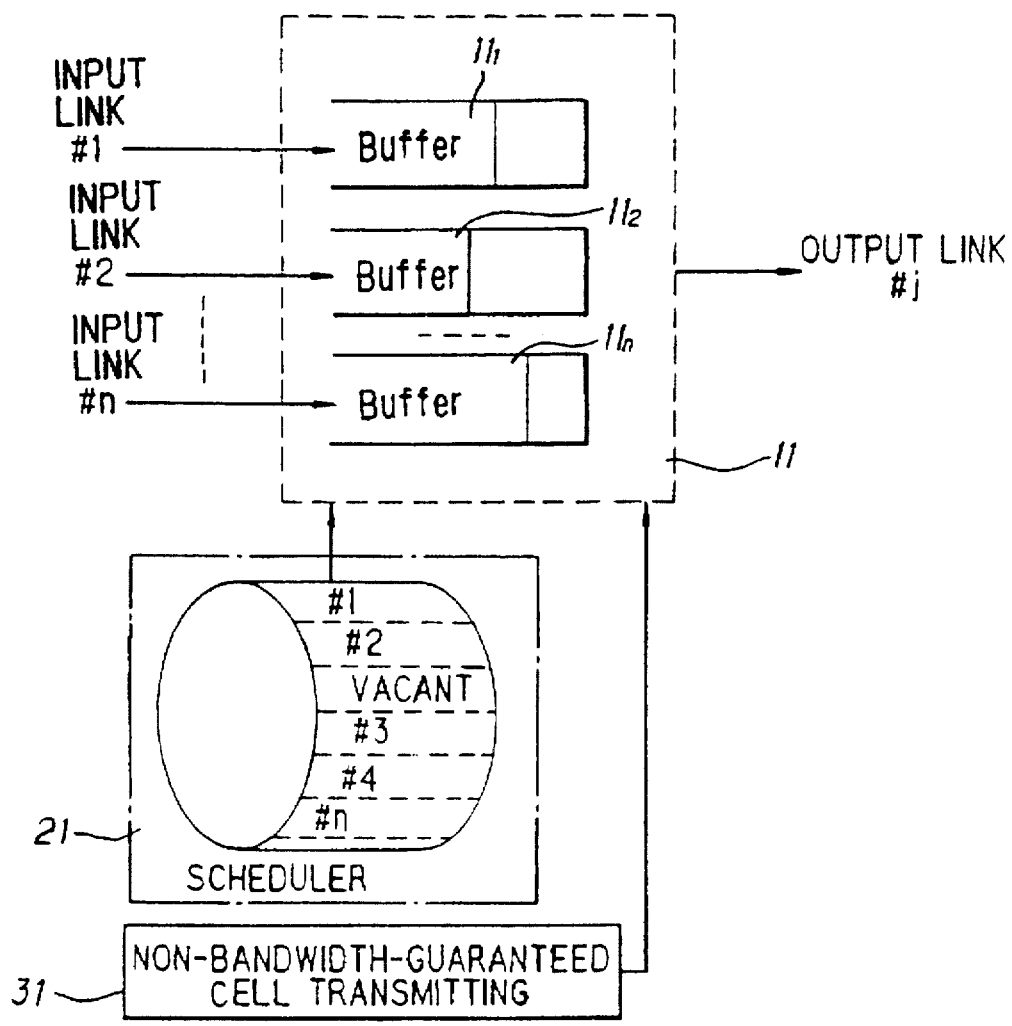
FIGS. 1(a) and (b) are schematic explanatory views of the present invention.

In FIG. 1(a), the reference numerals $11_1$ to $11_n$ represent buffers for storing ATM cells which are supplied from input links #1 to #n and are to be transmitted to an output link #j, 21 a scheduler for reading an ATM cell of a bandwidth-guaranteed connection call from the buffer of each input link in accordance with a predetermined scheduling and outputting it to the output link, and 31 a non-bandwidth-guaranteed cell transmitting means for transmitting an ATM cell of a non-bandwidth-guaranteed connection call at a time which is not allocated to any bandwidth-guaranteed connection call.

Figure 1B:
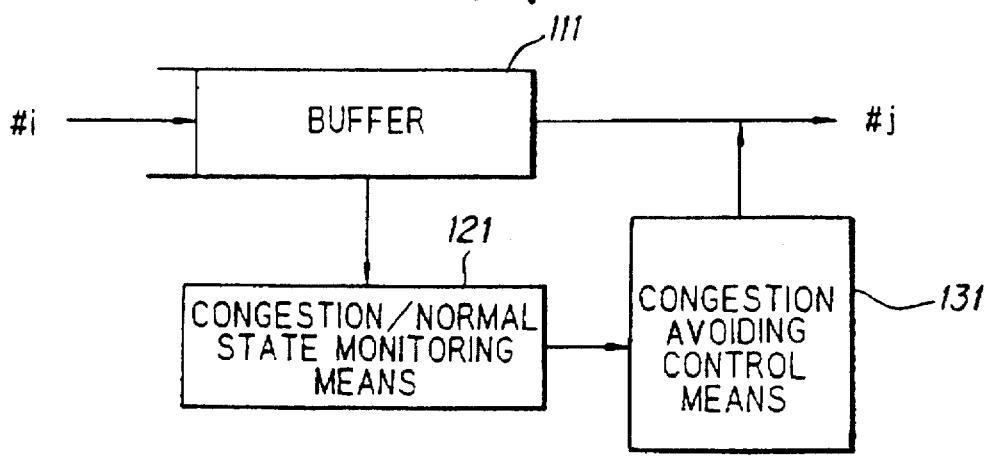

In FIG. 1(b), the reference numeral 111 represents a buffer for storing in a queue ATM cells which are supplied from the input link # and which are to be transmitted to the output link #j, 121 a congestion/normal state monitoring means for detecting the occurrence of a long-term congestion and judging whether or not the normal state is restored from the congestion, and 131 a congestion avoiding control means for exerting congestion avoiding control when a long-term congestion occurs and ending it when a normal state is restored.

(a) QOS Control (FIG. 1(a))

The scheduler 21 allocates the predetermined number of time slots which correspond to the required bandwidth to the bandwidth-guaranteed connection call from among the M time slots which constitute one period. The scheduler 21 schedules so that an ATM cell is read from the corresponding buffer at an allocated time slot and that it is transmitted to the output link. The non-bandwidth-guaranteed cell transmitting means 31 reads an ATM cell of the non-bandwidth-guaranteed connection call from the corresponding buffer and transmits it to the output link at a time slot which is not allocated to any bandwidth-guaranteed connection call. In this manner, an ATM exchange can utilize both a statistical multiplex system and a traffic shaping system to have the respective merits. In other words, by decisively allocating a necessary bandwidth to a bandwidth-guaranteed connection call which is required to have a predetermined QOS, it is possible to transmit ATM cells having such a quality to an output link. On the other hand, it is possible to transmit ATM cells of a non-bandwidth-guaranteed connection call to the output link in such a manner as to enhance the utilization of the output link.

The scheduler 21 allocates the number of time slots which correspond to the required bandwidth for each bandwidth-guaranteed connection call and enters the number of an input link which accommodates the call in the allocated time slot. The scheduler 21 schedules so that cells are read from the buffer corresponding to the input link at the allocated time slots and that they are transmitted to the output link. In this way, it is possible to decisively allocate a necessary bandwidth for each connection or each input link and to transmit ATM cells, thereby maintaining a predetermined QOS.

Furthermore, the ATM exchange is also provided with a shared buffer for storing ATM cells which arrive from one input link at a multiplex speed of N·V, and address management buffers corresponding to respective quality class numbers for specifying the quality conditions. The addresses in the shared buffer at which ATM cells are stored are queued in the address management buffers which correspond to the quality class numbers of the ATM cells. With respect to a bandwidth-guaranteed connection call, the scheduler allocates the number of time slots which correspond to the required bandwidth which is necessary for satisfying the quality class of the call and enters the quality class number in the corresponding allocated slots. In this state, the scheduler schedules so that the address is read from the address management buffer designated by the quality class number at each time slot and that an ATM cell is read from the shared buffer on the basis of the read address and transmitted to the output link. In this way, it is possible to decisively allocate the necessary bandwidth for each quality class and transmit ATM cells, thereby maintaining a predetermined QOS.

The scheduler 21 also divides the time slots which are not allocated to any bandwidth-guaranteed connection call into ① time slots at which ATM cells of a non-bandwidth-guaranteed connection call can be transmitted and ② time slots at which ATM cells cannot be transmitted. The non-bandwidth-guaranteed cell transmitting means 31 transmits ATM cells of a non-bandwidth-guaranteed connection call only at the time slots at which ATM cells can be transmitted. In this case, the non-bandwidth-guaranteed cell transmitting means 31 transmits ATM cells of a non-bandwidth-guaranteed connection call in the order of arrival. In this way, it is possible to regulate the allocation of a bandwidth to a non-bandwidth-guaranteed connection call so as not to exceed a predetermined bandwidth, thereby enhancing the utilization of the output link. In addition, it is possible to transmit cells of a non-bandwidth-guaranteed connection call efficiently in accordance with a cross-point buffer system by FIFO read control type.

In the case of accepting a new bandwidth-guaranteed connection call, the queue length Qi in a shared buffer which should be maintained in order to satisfy the quality conditions of all calls having the same quality class number #i as that of the new call is obtained, and a threshold is set at the value computed by subtracting the queue length Qi (i=1, 2, ...) of all the quality classes from a shared buffer length B. When the number of cells of a non-bandwidth-guaranteed connection call stored in the shared buffer becomes equal to the threshold, it is thereafter inhibited to write ATM cells of a non-bandwidth-guaranteed connection call into the shared buffer. In this manner, it is possible to acquire necessary bandwidth for the bandwidth-guaranteed connection calls even if ATM cells of a non-bandwidth-guaranteed connection call frequently reach.

The queue length Qi in a shared buffer which should be maintained in order to satisfy the quality conditions of a quality class #i is obtained for each quality class, and the number of ATM cells of the bandwidth-guaranteed connection calls having a predetermined quality class number #i which remain in the shared buffer is monitored for each quality class number. When the number of remaining cells is equal to the queue length Qi, the ATM cell of a bandwidth-guaranteed connection call having the quality class number #i which reaches next is discarded. In this manner, it is possible to acquire the bandwidth so as to securely maintain the qualities of all the quality classes even if many cells having a specific quality class number reach.

(b) Congestion Avoiding Control (FIG. 1(b))

The congestion/normal state monitoring means 121 detects the occurrence of a long-term congestion which is different from a short-term congestion caused by simultaneous arrival of cells in a normal state, and judges whether or not the normal state is restored from the congestion under congestion avoiding control. The congestion avoiding control means 131 exerts congestion avoiding control when a long-term congestion occurs and ends it when a normal state is restored. In this case, the congestion/normal state monitoring means 121 compares the queue length of the queuing buffer 111 for queuing the cells supplied thereto with a preset value so as to detect the occurrence of a long-term congestion and the restoration to a normal state.

In this manner, it is possible to detect a long-term congestion distinguished from a short-term congestion and quickly restore a normal state by exerting congestion avoiding control. In addition, it is possible to avoid an oscillation phenomenon that the operations of starting and ending congestion avoiding control are frequently repeated by inhibiting control for ending congestion avoiding control for a predetermined time after the start of the congestion avoiding control.

To state this more concretely, a threshold $X_{ON}$ which represents the occurrence of a long-term congestion and a threshold $X_{OFF}$ ($X_{ON} > X_{OFF}$) which represents the restoration of a normal state are set in advance. The congestion/normal state monitoring means 121 judges the fact that the observed value of the queue length at every predetermined observation time $T_{O1}$ consecutively exceeds the threshold $X_{ON}$ a predetermined number $N_{O1}$ ($N_{O1} \geq 1$) of times to be the occurrence of a long-term congestion, while judging the fact that the observed value of the queue length at every predetermined observation time $T_{O2}$ under congestion avoiding control is consecutively below the threshold $X_{OFF}$ a predetermined number $N_{O2}$ ($N_{O2} \geq 1$) of times to be the restoration to a normal state. Alternatively, the congestion/normal state monitoring means 121 judges the fact that the maximum queue length of the buffer in every predetermined observation time $T_{O1}$ consecutively exceeds the threshold $X_{ON}$ a predetermined number $N_{O1}$ ($N_{O1} \geq 1$) of times to be the occurrence of a long-term congestion, while judging the fact that the maximum queue length in every predetermined observation time $T_{O2}$ under congestion avoiding control is consecutively below the threshold $X_{OFF}$ a predetermined number $N_{O2}$ ($N_{O2} \geq 1$) of times to be the restoration to a normal state.

In this way, it is possible to obviate the difficulty in determining a threshold with the form of information flowing into a buffer taken into consideration, and to securely detect the occurrence of a long-term congestion and the restoration to a normal state.

(B) QOS Control (a) First Embodiment (a-1) Structure

Figure 2:
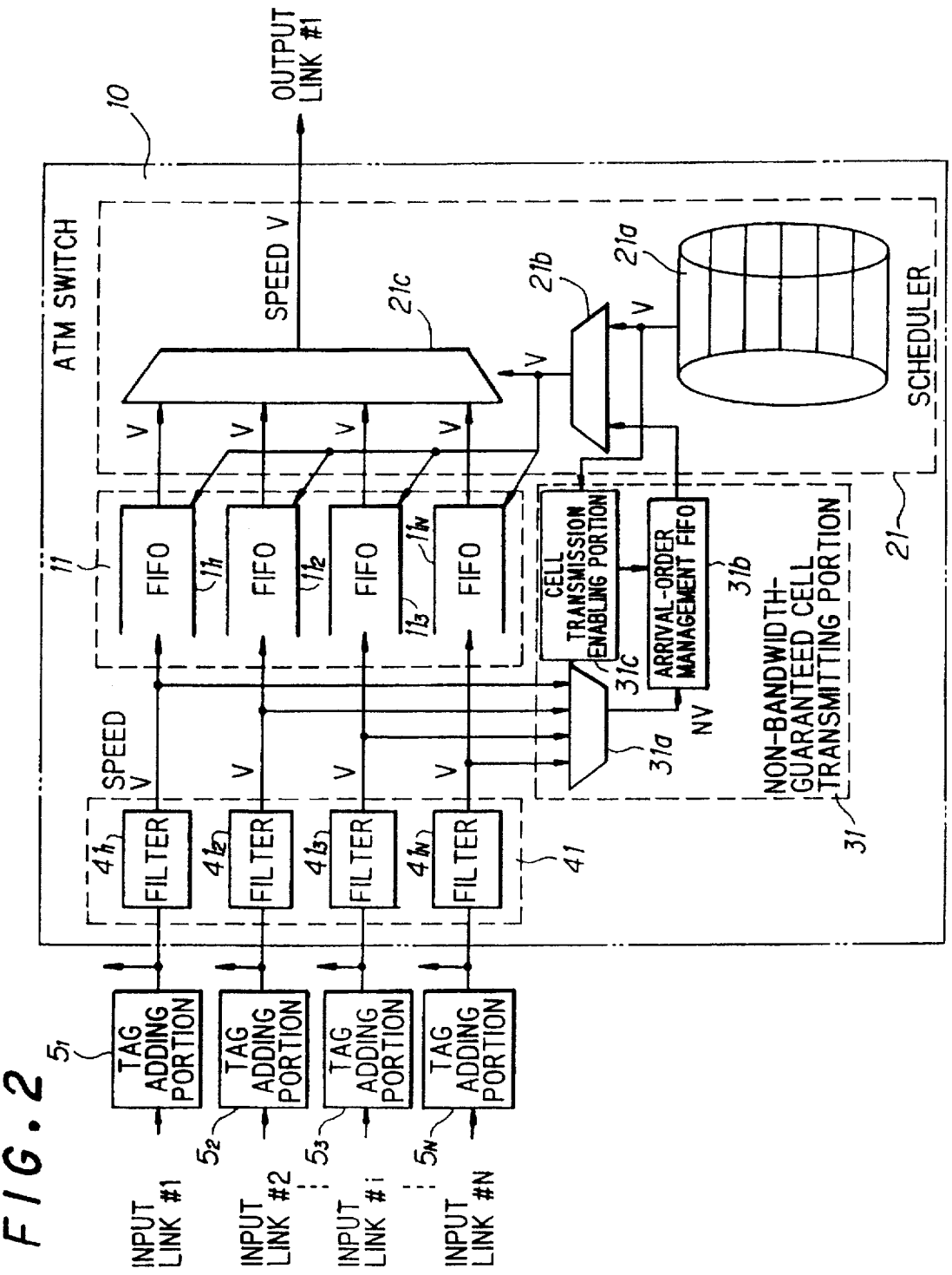
FIG. 2 shows the structure of a first embodiment for realizing QOS control according to the present invention.

FIG. 2 shows the structure of a first embodiment of QOS control when there are both a bandwidth-guaranteed connection call and a non-bandwidth-guaranteed connection call together. The bandwidth-guaranteed connection call is a call which requires a bandwidth to be guaranteed, and the non-bandwidth-guaranteed connection call is a call which does not require a bandwidth to be guaranteed and a cell of which may be transmitted only when no information of a bandwidth-guaranteed connection call is transmitted.

In the first embodiment shown in FIG. 2, with respect to a bandwidth-guaranteed connection call, ATM cells are transmitted to the output link for each connection or for each input link by a traffic shaping system. With respect to a non-bandwidth-guaranteed connection call, ATM cells are transmitted to the output link by a statistical multiplex system (cross-point buffer system by FIFO read control).

Figure 3:
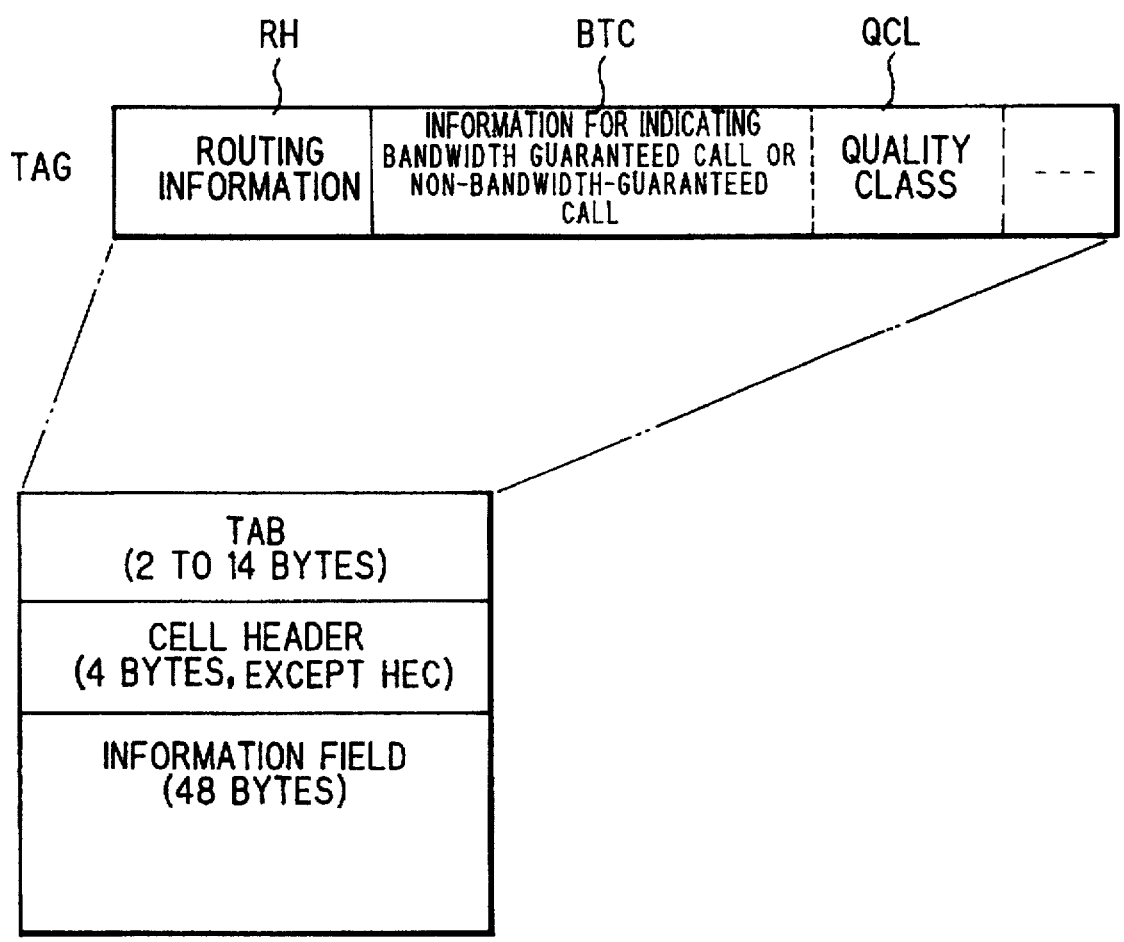
FIG. 3 is an explanatory view of a tag.

In FIG. 2, the reference numerals $5_1$ to $5_N$ represent control information add-on circuits (tag adding portions) for attaching tags to the ATM cells in correspondence with the input links #1 to #N from which the ATM cells arrive, and replacing the VCI/VPI. The tag includes, for example, routing information RH, information BTC indicating whether the cell belongs to a bandwidth-guaranteed connection call or a non-bandwidth-guaranteed connection call, and a number QCL specifying the quality class (cell loss ratio, delay time, etc.), as shown in FIG. 3.

The reference numeral 10 represents an ATM switch provided in correspondence with each of the output links #1 to #N. Although only one ATM switch for the output link #1 is shown in FIG. 2, the other ATM switches have the same structure. The reference numeral 11 denotes a FIFO buffer portion provided in correspondence with each of the input links #1 to #N so as to store in a queue ATM cells which are to be output to the output link #1, 21 a scheduler for transmitting ATM cells of a bandwidth-guaranteed connection call by a traffic shaping system, 31 a non-bandwidth-guaranteed cell transmitting portion for transmitting ATM cells of a non-bandwidth-guaranteed connection call by a statistical multiplex system (cross-point buffer system by FIFO read control), and 41 a filter portion for selecting cells which are to be transmitted to the output link #1 from the ATM cells which arrive from each of the input links #1 to #N on the basis of the routing information RH, and inputting the selected cells to the FIFO buffer portion 11 and the non-bandwidth-guaranteed cell transmitting portion 31 at the subsequent stage. The filter portion 41 has filters $41_1$ to $41_N$ in correspondence with the input links #1 to #N, respectively.

In the FIFO buffer portion 11, the reference numerals $11_1$ to $11_N$ represent FIFO buffers for storing, in the order of arrival, the ATM cells which arrive from each of the input links #1 to #N and which are selected so as to be transmitted to the output link #1. In each buffer, both bandwidth-guaranteed connection calls and non-bandwidth-guaranteed connection calls are stored in the order of arrival irrespective of the kinds of the calls.

In the non-bandwidth-guaranteed cell transmitting portion 31, the reference numeral 31a represents a non-bandwidth-guaranteed cell selecting portion for extracting a non-bandwidth-guaranteed cell from the ATM cells which are output from each of the filters $41_1$ to $41_N$ and outputting the number of the input link from which the cell arrives, and 31b an arrival-order management FIFO for storing, in the order of arrival, the numbers of the input links from which the ATM cells of a non-bandwidth-guaranteed connection call arrive. In place of the numbers, the arrival-order management FIFO 31b may store the data for specifying the FIFO buffers for storing the ATM cells. The reference numeral 31c denotes a cell transmission enabling portion for enabling a cell of a non-bandwidth-guaranteed connection call to be transmitted when no cell of a bandwidth-guaranteed connection call is transmitted. The cell transmission enabling portion 31c detects a time slot which is designated to be "vacant" in a scheduling table which will be described later, and reads and output an input link number from the head of the arrival-order management FIFO 31b.

Figure 4A:
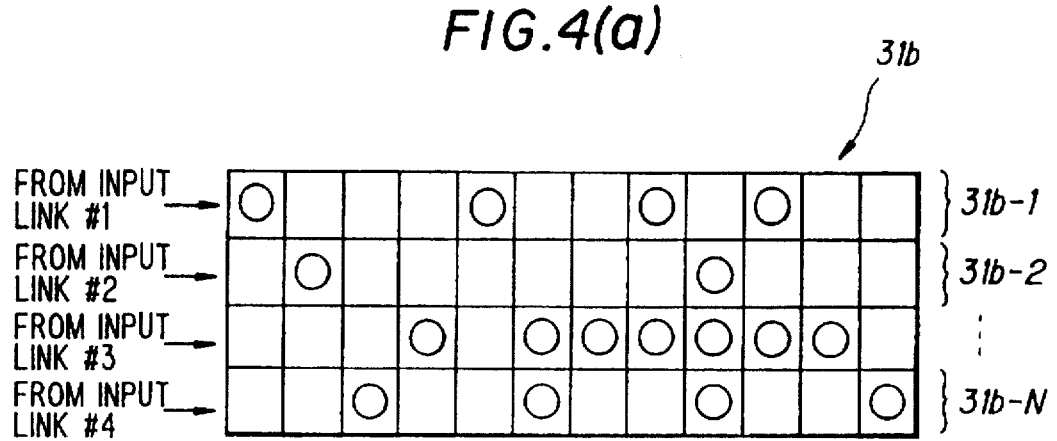
FIGS. 4(a) and (b) explains the writing and reading operations in an arrival-order management FIFO.
Figure 4B:
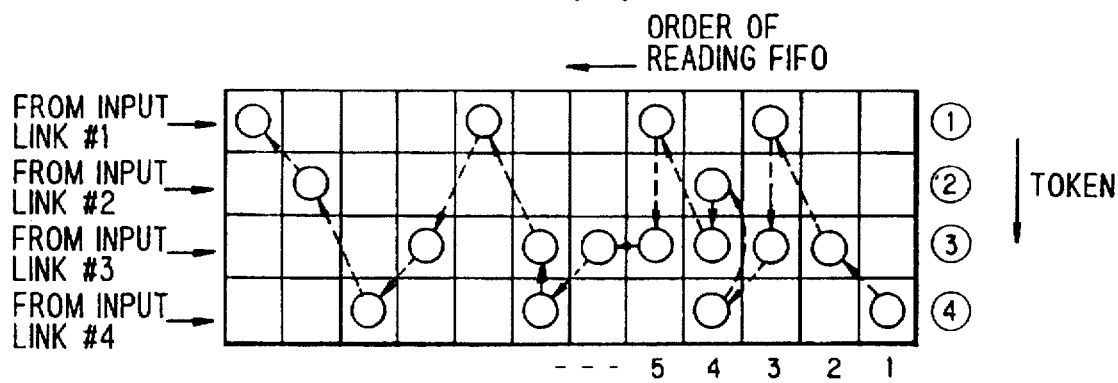

Actually, the arrival-order management FIFO 31b is provided with storage portions 31b-1 to 31b-N in correspondence with the input links #1 to #N, respectively, as shown in FIG. 4(a), in consideration of the case in which non-bandwidth-guaranteed cells are input from all the input links #1 to #N at the same time, and the order of reading is determined by the position of a token, as shown in FIG. 4(b). That is, although the cells are read in the order of arrival in principle, when cells arrive at the same time, the order of reading is determined by the position of the token. In the example shown in FIG. 4(b), cells simultaneously arrive from the input links #1 and #3 as the third cells, but since the position of the token goes around in the order of ①, ②, ③, ④, ①, . . . , the cell of the input link number #1 is output prior to the cell of the input link number #3. Similarly, the cells of the input link numbers #1-#4 are output in the order indicated by the dot arrows.

In the scheduler 21, the reference numeral 21a represents a scheduling table. The scheduler 21 allocates the predetermined number of time slots which correspond to a required bandwidth to each bandwidth-guaranteed connection call from among M time slots which constitute one period. The scheduler 21 writes the number of each input link which accommodates each call in the allocated time slots of the scheduling table 21a and "vacant" is written in a time slot which is not allocated to any bandwidth-guaranteed connection call. In this case, the time slots having the same input link numbers are not concentrated at one point of one period but evenly dispersed.

FIG. 5 explains the contents of the scheduling table 21a. In each of M time slots $T_1$ to $T_M$ which constitute one period, an input link number or "vacant" is written. The reference numeral 21b in FIG. 2 denotes a selector for selecting and outputting an input link number when it is read out of the scheduling table 21a, while selecting and outputting the input link number that is read from the arrival-order management FIFO 31b when "vacant" is read out of the scheduling table 21a. The reference numeral 21c represents a selector for reading an ATM cell from one of the FIFO buffers $11_1$ to $11_N$ which is designated by the input link number output from the selector 21 and outputting the ATM cell to the output link #1.

In the example shown in FIG. 5, at the time slots $T_1$, $T_6$, ... ATM cells are read out of the FIFO buffer $11_1$ of the input link #1 and transmitted to the output link #1, at the time slots $T_2$, $T_7$, ... ATM cells are read out of the FIFO buffer $11_2$ of the input link #2 and transmitted to the output link #1, and at the time slots $T_3$, ... ATM cells are read out of the FIFO buffer $11_3$ of the input link #3 and transmitted to the output link #1. Similarly, ATM cells are read out of each buffer and transmitted to the output link #1. At the time slots $T_4$, $T_8$, ... in which "vacant" is written, ATM cells are read out of a predetermined FIFO buffer which is designated by the non-bandwidth-guaranteed cell transmitting portion 31 and transmitted to the output link.

(b-1) Operation as a Whole

When a bandwidth-guaranteed connection call generates and requests admission, a call processor (not shown) judges whether or not there is a vacant band which satisfies the required bandwidth of the call by a connection admission control, and if the answer is in the affirmative, the call processor accepts the bandwidth-guaranteed connection call. The call processor then allocates the number of time slots which correspond to the required bandwidth (necessary bandwidth for guaranteeing the quality) to the bandwidth-guaranteed connection call from among the M time slots which constitute one period, and writes the number of the input link for accommodating the call into the allocated time slots. Calls are accepted in this way, and the remaining time slots are handled as "vacant".

When the ATM cells arrive from the input links #1 to #N, the tag adding portions $5_1$ to $5_N$ attach tags thereto, and thereafter the ATM cells are input to ATM switches which correspond to the output links #1 to #N. Each of the filters $41_1$ to $41_N$ selects the ATM cells which are to be transmitted to the output link #1 and serially inputs the selected ATM cells to the corresponding FIFO buffers $11_1$ to $11_N$. The FIFO buffers $11_1$ to $11_N$ stores the received ATM cells in a queue. When the ATM cells output from the filters $41_1$ to $41_N$ are non-bandwidth-guaranteed cells, the numbers of the input links from which the ATM cells are supplied are stored in the arrival-order management FIFO 31b.

The scheduler 21 serially reads out the contents of the time slots in the scheduling table 21a at a predetermined speed. When an input link number is read out, an ATM cell is read out of the FIFO buffer which is designated by the input link number and transmitted to the output link. In this manner, it is possible to transmit a cell so as to satisfy the required bandwidth for each connection call or each link. On the other hand, when "vacant" is read out, the non-bandwidth-guaranteed cell transmitting portion 31 outputs the first input link number from the arrival-order management FIFO 31b, and the selector 21c reads the ATM cell from the FIFO buffer designated by the input link number and transmits it to the output link. In this manner, cells of a non-bandwidth-guaranteed connection call are output in the order of arrival when no bandwidth-guaranteed cell is transmitted.

Actually, there is a case in which the ATM cell read out of the FIFO buffer which is designated by the input link number read out of the scheduling table 21a is not a bandwidth-guaranteed cell but a non-bandwidth-guaranteed cell. Reversely, there is a case in which the ATM cell read out of the FIFO buffer which is designated by the input link number read out of the arrival-order management FIFO 31b is not a non-bandwidth-guaranteed cell but a bandwidth-guaranteed cell. However, on the whole, with respect to a bandwidth-guaranteed connection call, it is possible to transmit cells so as to satisfy the required bandwidth for each connection call or each input link, and with respect to a non-bandwidth-guaranteed connection call, it is possible to transmit cells in the order of arrival.

(a-3) Modification

In the first embodiment, the bandwidth which corresponds to all vacant time slots is allocated to a non-bandwidth-guaranteed connection call. However, there is a case in which regulation is desirable so that the bandwidth allocated to a non-bandwidth-guaranteed connection call does not exceed the required bandwidth. In such a case, the vacant time slots which are not allocated to any bandwidth-guaranteed connection call are divided into ① time slots SOK at which ATM cells of a non-bandwidth-guaranteed connection call can be transmitted, and ② time slots SNO at which ATM cells of a non-bandwidth-guaranteed connection call can not be transmitted, as shown in FIG. 6. The bandwidth which is allocated to a non-bandwidth-guaranteed connection call is regulated by adjusting the number of vacant time slots which allows transmission. When the scheduling table 21a has such a structure, the cell transmission enabling portion 31c of the non-bandwidth-guaranteed cell transmitting means 31 controls so that the input link number is output from the arrival order control FIFO only at the time slot SOK which allows transmission, and no input link number is output from the arrival order control FIFO at the time slot SNO which does not allow transmission.

(b) Second Embodiment (b-1) Structure

Figure 7:
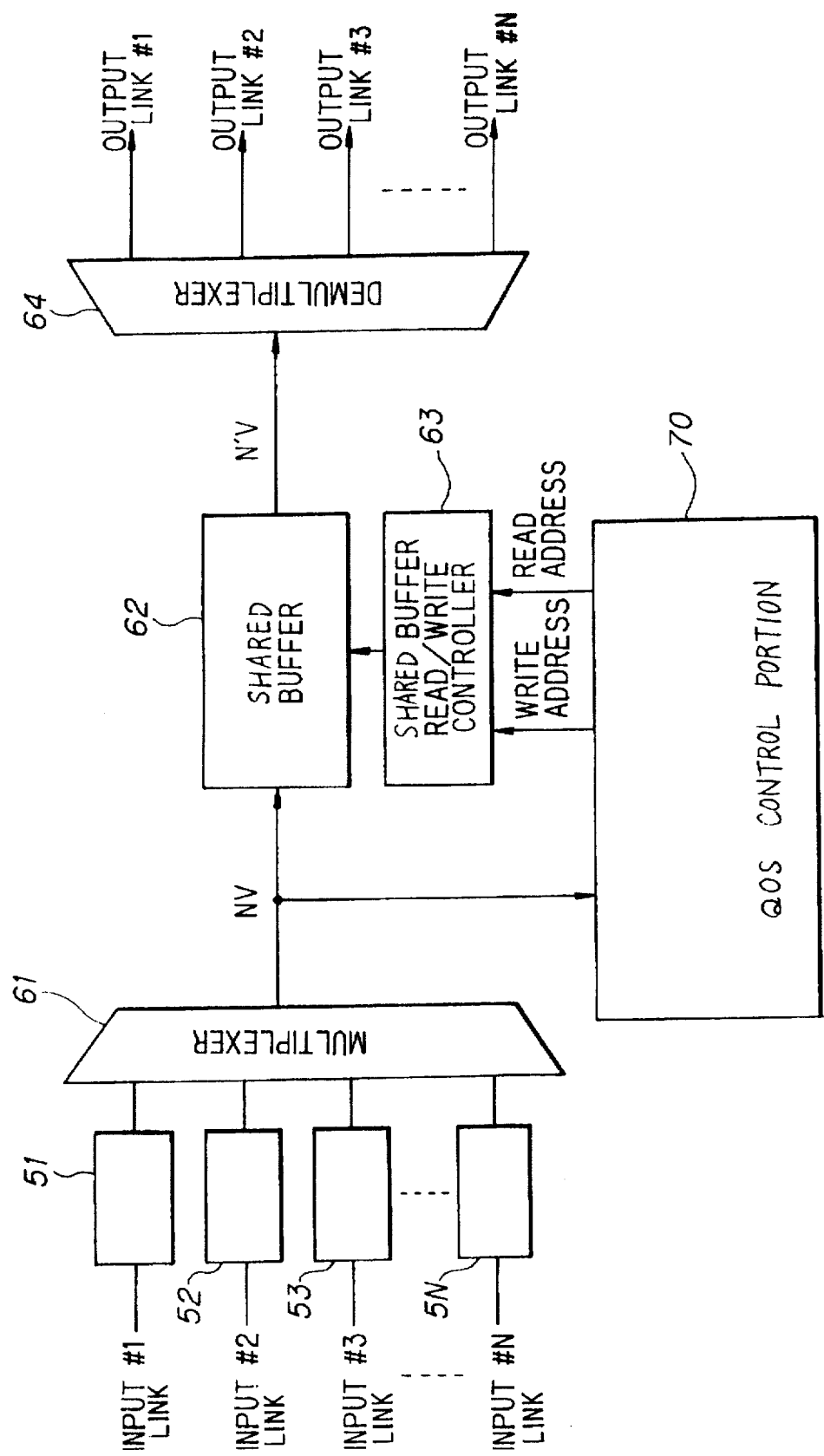
FIG. 7 shows the entire structure of a second embodiment for realizing QOS control according to the present invention.
Figure 8:
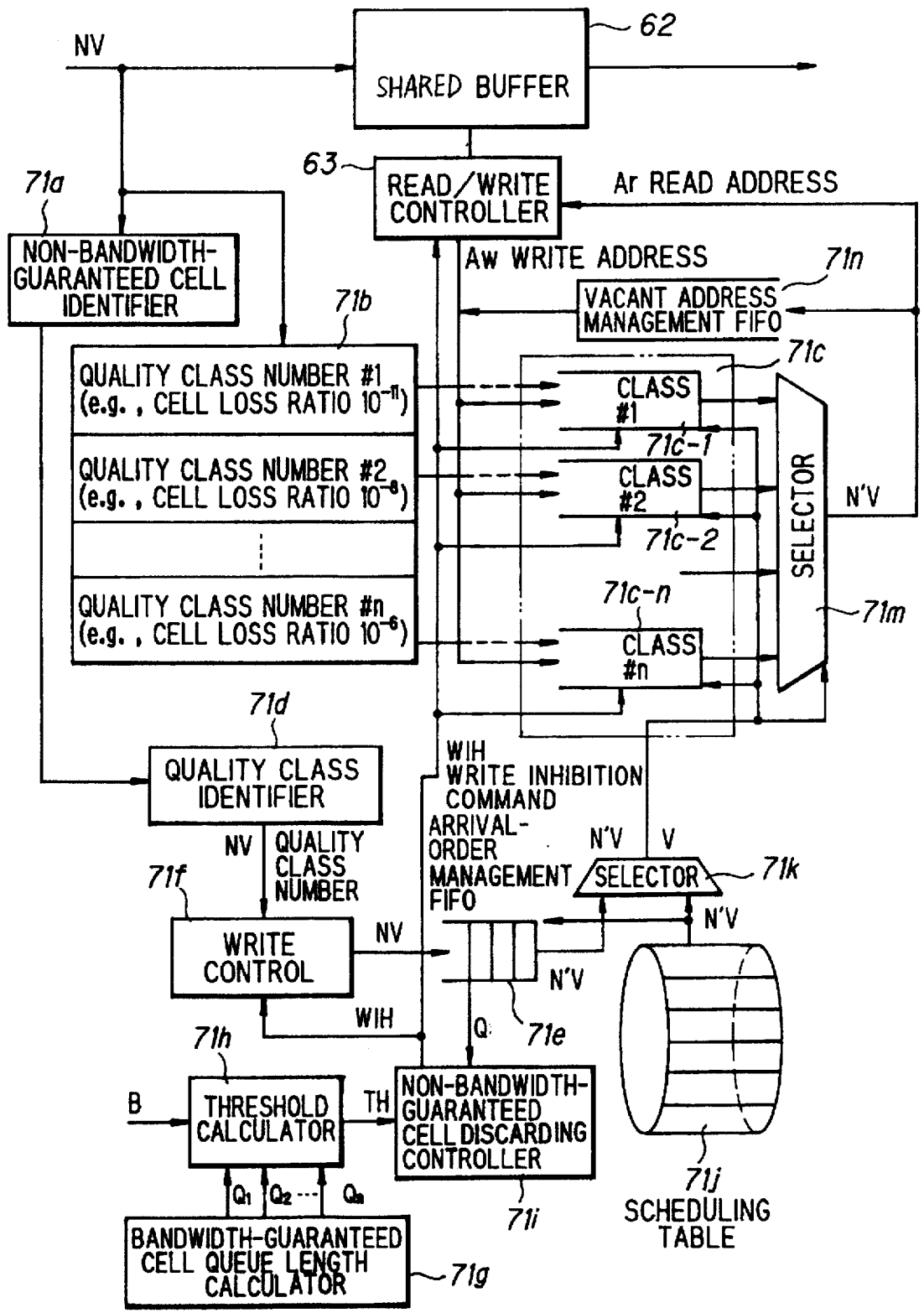
FIG. 8 shows the structure of a QOS control portion.

FIGS. 7 and 8 show the structure of a second embodiment of QOS control when there are both a bandwidth-guaranteed connection call and a non-bandwidth-guaranteed connection call together. In the second embodiment, with respect to a bandwidth-guaranteed connection call, ATM cells are transmitted to the output link by a traffic shaping system taking the quality class numbers into consideration, and with respect to a non-bandwidth-guaranteed connection call, ATM cells are transmitted to the output link by a statistical multiplex system (cross-point buffer system by FIFO read control). The quality class number is a number specifying each class when the required quality conditions (cell loss ratio, delay time, etc.) are classified into a plurality of (n) classes.

In FIG. 7, the reference numerals 51 to 5N represent control information add-on circuits (tag adding portions) for attaching tags to the ATM cells for each of the input links #1 to #N from which the ATM cells arrive at a speed of V, and replacing the VCI/VPI. The tag includes, for example, routing information RH, information BTC indicating whether the cell belongs to a bandwidth-guaranteed connection call or a non-bandwidth-guaranteed connection call, and a number QCL specifying the quality class (cell loss ratio, delay time, etc.), as shown in FIG. 3. The reference numeral 61 denotes a multiplexer for multiplexing all the ATM cells arriving from the input links #1 to #N at a speed of V and outputting the multiplexed cell at a speed of NV, 62 a shared buffer for storing the ATM cells arriving from the multiplexer at a speed of NV, 63 a shared buffer read/write controller for controlling the reading/writing operation of the shared buffer on the basis of the input write address or read address and inhibiting writing according to circumstances, and 64 a demultiplexer for separating the ATM cell having a speed of N'V (N'≦N) which is read from the shared buffer on the basis of the routing information (tags) and transmitting the separated cells to the output links #1 to #N. The reference numeral 70 denotes a QOS control portion for decisively allocating a bandwidth to each quality class for a bandwidth-guaranteed connection call and allocating a bandwidth for a non-bandwidth-guaranteed connection call by a statistical multiplex system.

(b-2) QOS Control Portion

In FIG. 8, the reference numeral 71a represents a non-bandwidth-guaranteed cell identifying portion for judging whether an input cell having a speed of NV is a bandwidth-guaranteed cell or a non-bandwidth-guaranteed cell, 71b a quality class identifier for identifying the quality class number of an input cell on the basis of the tag information, and outputting a write enable signal to an address management FIFO corresponding to the identified quality class, which will be described later, and 71c an address management buffer portion which is provided with an address management buffer (address management FIFO) in correspondence with each quality class number so as to queue the addresses in the shared buffer 62 at which the ATM cells having the quality class number are stored. The address management buffer portion 71c is provided with n address management buffers 71c-1 to 71c-n for the respective quality classes.

71d represents a second quality class identifier for identifying the quality class number of a non-bandwidth-guaranteed cell, 71e an arrival-order management FIFO memory for storing the quality class numbers output from the quality class identifier 71d in the order of arrival, 71f a write controller for writing a quality class number into the arrival-order management FIFO memory 71e, 71g a bandwidth-guaranteed cell queue length calculator for calculating the queue length Qi of the ATM cells which should be acquired in the shared buffer 62 for each quality class in order to satisfy the quality conditions thereof, 71h a threshold calculator for calculating the queue length (threshold TH) which corresponds to a bandwidth allocated to a non-bandwidth-guaranteed connection call by using each of the bandwidth-guaranteed cell queue lengths $Q_1$ to $Q_N$ of each quality class, and 71i a non-bandwidth-guaranteed cell discarding controller.

When it is possible to accept a new bandwidth-guaranteed connection call, the bandwidth-guaranteed cell queue length calculator 71g computes the queue length Qi in the shared buffer 62 which should be acquired in order to satisfy the quality conditions of all calls having the same class number as the quality class number #i of the new bandwidth-guaranteed connection call. If it is assumed that the bandwidth which is already allocated to the quality class #i is $R_o$ and the bandwidth of the bandwidth-guaranteed connection call of the quality class #i which is newly accepted by a connection admission control (CAC) is $R_n$, the queue length Qi which is to be acquired in the shared buffer 62 in order to satisfy the quality conditions prescribed by the quality class #i is $(R_o+R_n)$.

If it is assumed that the buffer length of the shared buffer 62 is B, the threshold calculator 71h calculates the threshold TH from the following formula:

$$TH=B-\Sigma Qi(i=1, 2, \ldots n).$$

The non-bandwidth-guaranteed cell discarding controller 71i compares the actual queue length Q of the non-bandwidth-guaranteed connection call with the threshold TH, and if Q>TH, the newly received non-bandwidth-guaranteed cell is discarded. In other words, if Q>TH, the non-bandwidth-guaranteed cell discarding controller 71i ① outputs a write inhibition command WIH so as not to write the non-bandwidth-guaranteed cell which has arrived at the shared buffer 62, ② does not write an address in the address management buffer 71c, and ③ does not write a quality class number in the arrival-order management FIFO memory 71e.

In the second embodiment, since the ATM cells from all the input links are concentrated and multiplexed, there is an interference between input links. For this reason, there is a case in which more non-bandwidth-guaranteed cells than necessary are stored in the shared buffer 62, so that the quality conditions prescribed by each quality class are not satisfied. In order to prevent this, the threshold calculator 71h obtains the threshold TH which satisfies the quality conditions prescribed by each quality class from the above formula, and the non-bandwidth-guaranteed cell discarding controller 71i discards the non-bandwidth-guaranteed cell beyond the threshold.

The reference numeral 71j represents a scheduling table. With respect to bandwidth-guaranteed connection calls, one period is divided into M time slots, and the predetermined number of time slots which correspond to each of the quality classes are allocated thereto. The quality class number is entered in the allocated time slots and "vacant" is entered in a time slot which is not allocated to any quality class number. In this case, the time slots having the quality class numbers are not concentrated at one point of one period but evenly dispersed. The reference numeral 71k denotes a first selector for selecting and outputting a quality class number when it is read out of the scheduling table 71j, while selecting and outputting the quality class number that is read out of the head of the arrival-order management FIFO 71e when "vacant" is read out of the scheduling table 71j.

The reference numeral 71m represents a second selector for reading an address from one of the address management FIFOs 71c-1 to 71c-n which is designated by the quality class number output from the selector 71k and inputting the read address Ar to the read/write controller 63. The read/write controller 63 reads an ATM cell from a position of the shared buffer 62 which is designated by the read address and inputs it to the demultiplexer 64 at the subsequent stage (FIG. 7).

The reference numeral 71n denotes a vacant address management portion (vacant address management FIFO memory) for managing the vacant addresses of the shared buffer 62, in which all the addresses of the shared buffer 62 are written in a predetermined order as vacant addresses at the initiation. From the vacant address management FIFO 71n, write addresses Aw are read in that order and received ATM cells are written in the positions of the shared buffer 62 which are designated by the write addresses Aw. The write addresses Aw are then stored in the address management FIFO 71c-i which corresponds to the quality class number of the received ATM cells. The address (read address) Ar which is read out of each address management FIFO 71c-i by the selector 71m is input in the vacant address management FIFO 71n and stored therein as a vacant address.

The first and second selectors 71k, 71m and the vacant address management FIFO memory 71n constitute a shared buffer address control mechanism.

(b-3) Operation as a Whole

When the ATM cells arrive from the input links #1 to #N, the tag adding portions 51 to 5N (FIG. 7) attaches tags thereto, and thereafter the ATM cells are input to the multiplexer 61. The multiplexer 61 multiplexes all the ATM cells arriving from the input links #1 to #N with the tags attached thereto and outputs the multiplexed cell at a speed of NV. The shared buffer 62 writes each of the received ATM cells at the position designated by the write address Aw which is output from the vacant address management FIFO 71n (FIG. 8). The write address Aw is written in one of the address management FIFOs 71c-1 to 71c-n in correspondence with the quality class number of the received ATM cell. By repeating the same write operation as the above, the ATM cells are stored in the shared buffer 62 irrespective of kinds of the call, as well as the write addresses Aw are stored in the address management FIFOs 71c-1 to 71c-n in correspondence with the quality class numbers of the received ATM cells. At the same time, the quality class numbers of the non-bandwidth-guaranteed cells are stored in the arrival-order management FIFO 71e in the order of arrival.

In parallel with this operation, when a bandwidth-guaranteed connection call generates and requests admission, a call processor (not shown) judges whether or not there is a vacant band which satisfies the bandwidth corresponding to the quality class number of the call by the connection admission control (CAC), and if the answer is in the affirmative, the call processor accepts the connection call. The call processor then allocates the number of time slots corresponding to the bandwidth (required bandwidth) so as to satisfy the quality conditions of the quality class to which the connection call belongs from among the M time slots which constitute one period, and enters the quality class number into the allocated time slots. Calls are accepted in this way, and the remaining time slots are handled as "vacant".

The contents of the time slots in the scheduling table 71j are serially read out at a predetermined speed. When a quality class number is read out of the scheduling table 71j, the selectors 71k, 71m read the address from the one of the address management FIFOs 71c-1 to 71c-n designated by the quality class number and inputs the address to the read/write controller 63 and the vacant address management FIFO 71n.

The read/write controller 63 reads an ATM cell from the shared buffer 62 on the basis of the read address and inputs it to the demultiplexer 64 at the subsequent stage. The vacant address management FIFO 71n stores the read address Ar read out of the address management FIFO 71c as a vacant address.

On the other hand, when "vacant" is read out of the scheduling table 71j, the selector 71k outputs a first quality class number from the arrival-order management FIFO 71e, and the selector 71m reads an address Ar from one of the address management FIFOs 71c-1 to 71c-n designated by the quality class number and inputs the address to the read/write controller 63 and the vacant address management FIFO 71n. The read/write controller 63 reads an ATM cell from the shared buffer 62 on the basis of the read address Ar and inputs it to the demultiplexer 64 at the subsequent stage. The vacant address management FIFO 71n stores the read address Ar read out of the address management FIFO 71c as a vacant address.

Similarly, the write control and read control with respect to the shared buffer 62 are repeated, and with respect to a bandwidth-guaranteed connection call, it is possible to transmit cells so as to satisfy the required bandwidth for each quality class. With respect to non-bandwidth-guaranteed cells, it is possible to transmit them in the order of arrival when no bandwidth-guaranteed cell is transmitted.

A quality class number is read out of the scheduling table 71j and an address of the shared buffer 61 is read out of one of the address management FIFOs 71c-1 to 71c-n designated by the quality class number. In this case, a bandwidth-guaranteed cell is expected to be stored at this address. However, a non-bandwidth-guaranteed cell is sometimes stored. Reversely, when a quality class number is read out of the arrival-order management FIFO 71e and an address of the shared buffer 62 is read out of the address management FIFO designated by the quality class number. In this case, a non-bandwidth-guaranteed cell is expected to be stored at this address. However, there is a case where a bandwidth-guaranteed cell is stored. These cases are however no problem. Putting together, with respect to a bandwidth-guaranteed connection call, it is possible to transmit cells so as to satisfy the required bandwidth, and with respect to a non-bandwidth-guaranteed connection call, it is possible to transmit cells in the order of arrival.

(b-4) Quality Guarantee Due to Non-Bandwidth-Guaranteed Cell Discarding

When ATM cells from all the input links are concentrated and multiplexed, there is a case in which more non-bandwidth-guaranteed cells than necessary are stored in the shared buffer 62, so that the quality conditions prescribed by each quality class are not satisfied.

In order to prevent this, the bandwidth-guaranteed cell queue length calculator calculates the bandwidth-guaranteed cell queue length Qi at the time of reception of a new bandwidth-guaranteed connection call. If it is assumed that quality class number of the call is #i, the queue length Qi which is to be acquired in the shared buffer 62 in order to satisfy the quality conditions with respect to all the calls having the quality class number #i is computed. Thereafter, if it is assumed that the buffer length in the shared buffer 62 is B, the threshold calculator 71g calculates the threshold TH from the following formula:

$$TH = B - \Sigma Qi (i=1, 2, \ldots n).$$

The non-bandwidth-guaranteed cell discarding controller 71i compares the actual queue length (queue length in the arrival-order management FIFO 71e) Q of the ATM cells of a non-bandwidth-guaranteed connection call with the threshold TH, and if Q>TH, the non-bandwidth-guaranteed cell discarding controller 71i issues the write inhibition command WIH so as to discard the newly received non-bandwidth-guaranteed cell.

In this manner, it never occurs that more non-bandwidth-guaranteed cells than necessary are stored in the shared buffer 62, and the quality conditions prescribed by each quality class are satisfied.

(b-5) Modification

① First Modification

In the above embodiment, the bandwidth which correspond to all vacant time slots is allocated to a non-bandwidth-guaranteed connection call. However, there is a case in which regulation is desirable so that the bandwidth allocated to a non-bandwidth-guaranteed connection call does not exceed the required bandwidth. In such a case, the vacant time slots which are not allocated to any bandwidth-guaranteed connection call are divided into ① time slots at which ATM cells of a non-bandwidth-guaranteed connection call can be transmitted, and ② time slots at which ATM cells of a non-bandwidth-guaranteed connection call cannot be transmitted. It is possible to regulate the bandwidth which is allocated to a non-bandwidth-guaranteed connection call by adjusting the number of vacant time slots which allows transmission.

② Second Modification

Figure 9:
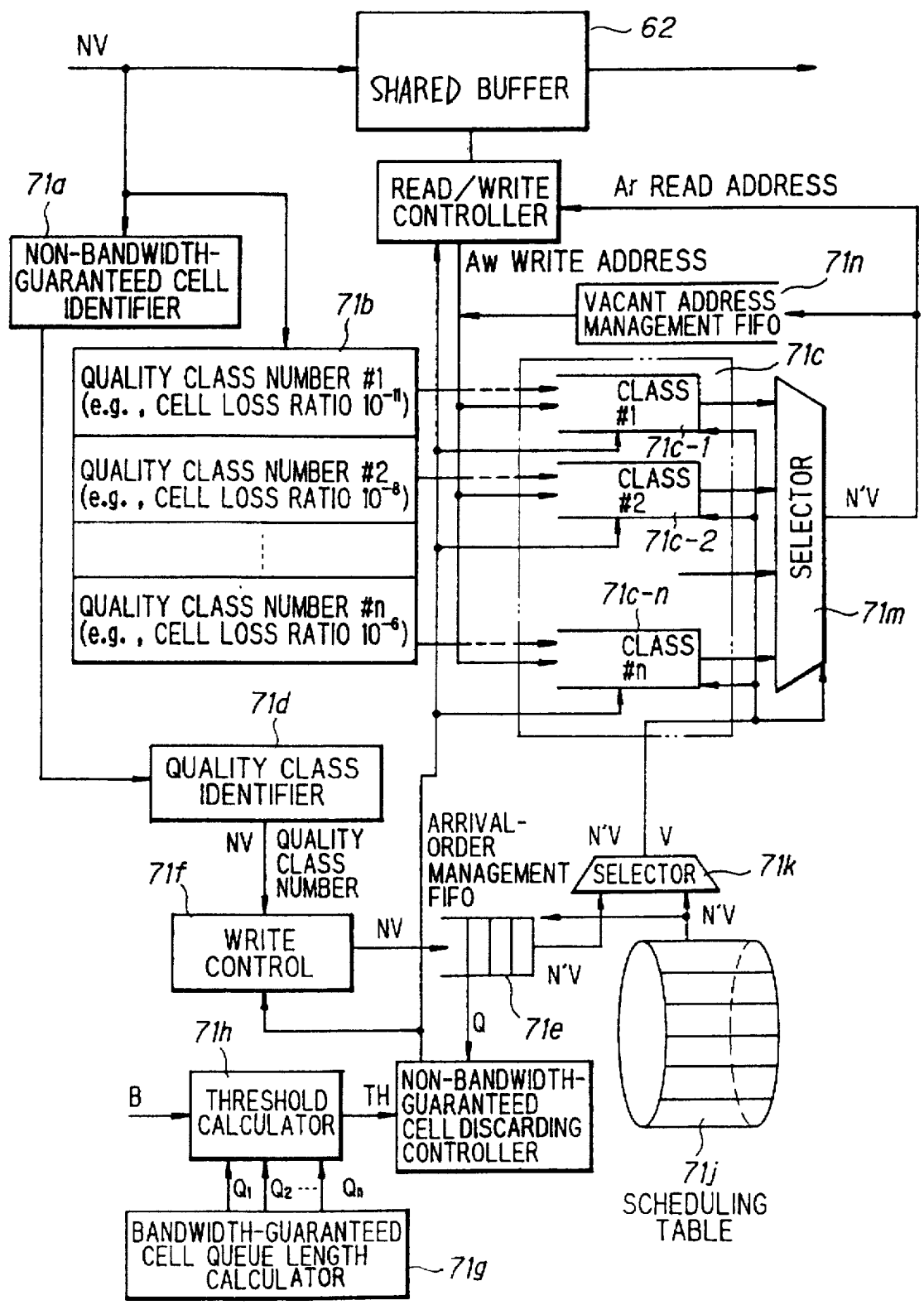
FIG. 9 shows the structure of another QOS control portion.

In the service control portion shown in FIG. 8, when many ATM cells of a specific quality class number reach, it may become impossible to maintain the qualities of other quality class numbers. FIG. 9 shows another QOS control portion which is capable of maintaining certainly a predetermined quality with respect to all quality class numbers. The same reference numerals are provided for the elements which are the same as those shown in FIG. 8. The reference numerals 71s-1 to 71s-n represent quality guaranteeing portions provided in correspondence with the respective quality class numbers. This QOS control portion is different from that shown in FIG. 8 in that these quality guaranteeing portions are provided.

Figure 10:
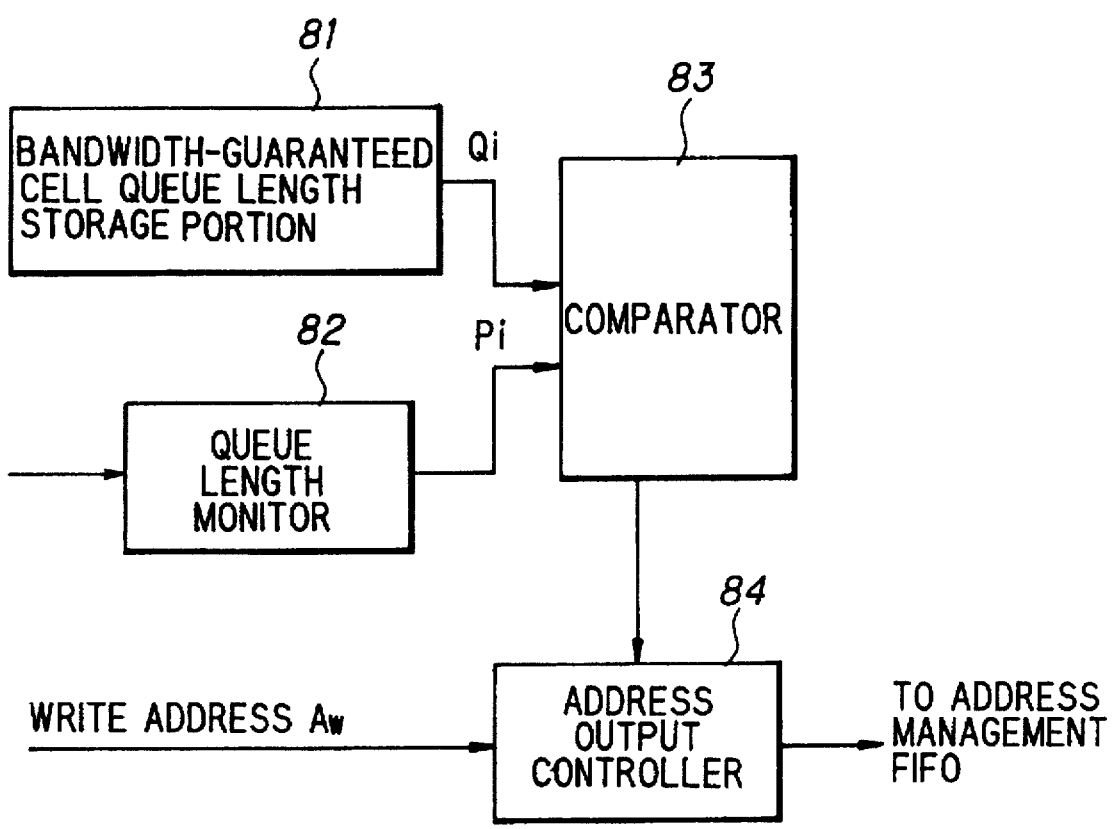
FIG. 10 shows the structure of a quality guaranteeing portion.

FIG. 10 shows the structure of the quality guaranteeing portion. The reference numeral 81 represents a storage portion for storing the bandwidth-guaranteed cell queue length Qi for the quality class #i calculated by the bandwidth-guaranteed cell queue length calculator 71g, 82 a queue length monitor for monitoring the number (queue length) Pi of bandwidth-guaranteed cells having the quality class number #i and remaining in the shared buffer 62, 83 a comparator for comparing the number Pi of remaining cells with the queue length Qi, and 84 an address output controller. The address output controller 84 allows a bandwidth-guaranteed ATM cell having the quality class number to be stored in the shared buffer 62 when Pi<Qi, so that the ATM cell write address is input to and stored in the address management FIFO 71c-i. However, when Pi=Qi, the address output controller 84 prevents the next ATM cell having the quality class number #i from being stored in the shared buffer 62 and, hence, prevents the address from being input to the address management FIFO 71c-i.

Due to this structure, it is possible to acquire the bandwidth so as to securely maintain the qualities of all the quality class numbers even if many cells having a specific quality class number reach.

(C) Congestion Control (a) First Embodiment (a-1) Structure

Figure 11:
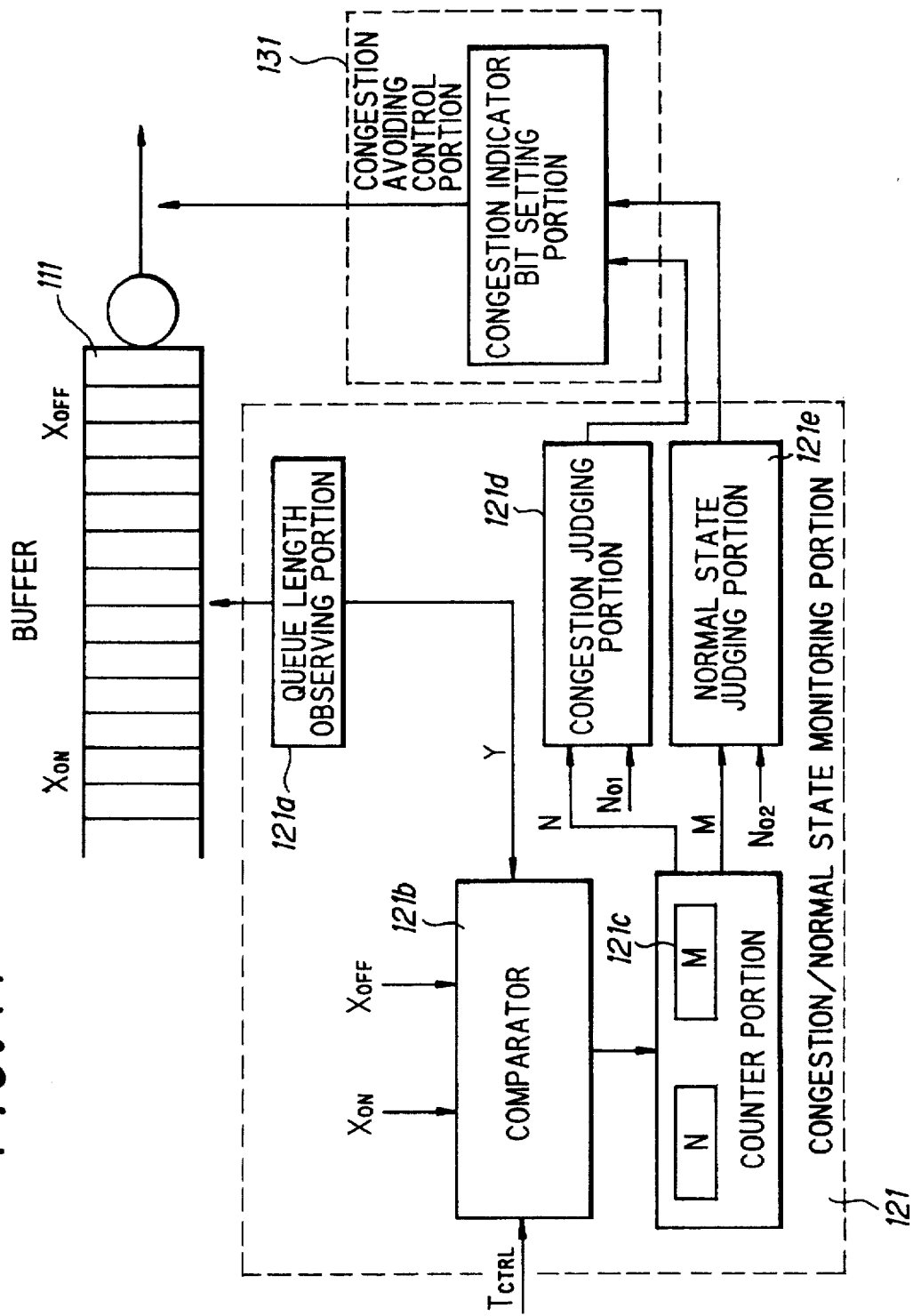
FIG. 11 shows the structure of a first embodiment of congestion control according to the present invention.

FIG. 11 shows the structure of a first embodiment of congestion control.

Figure 22:
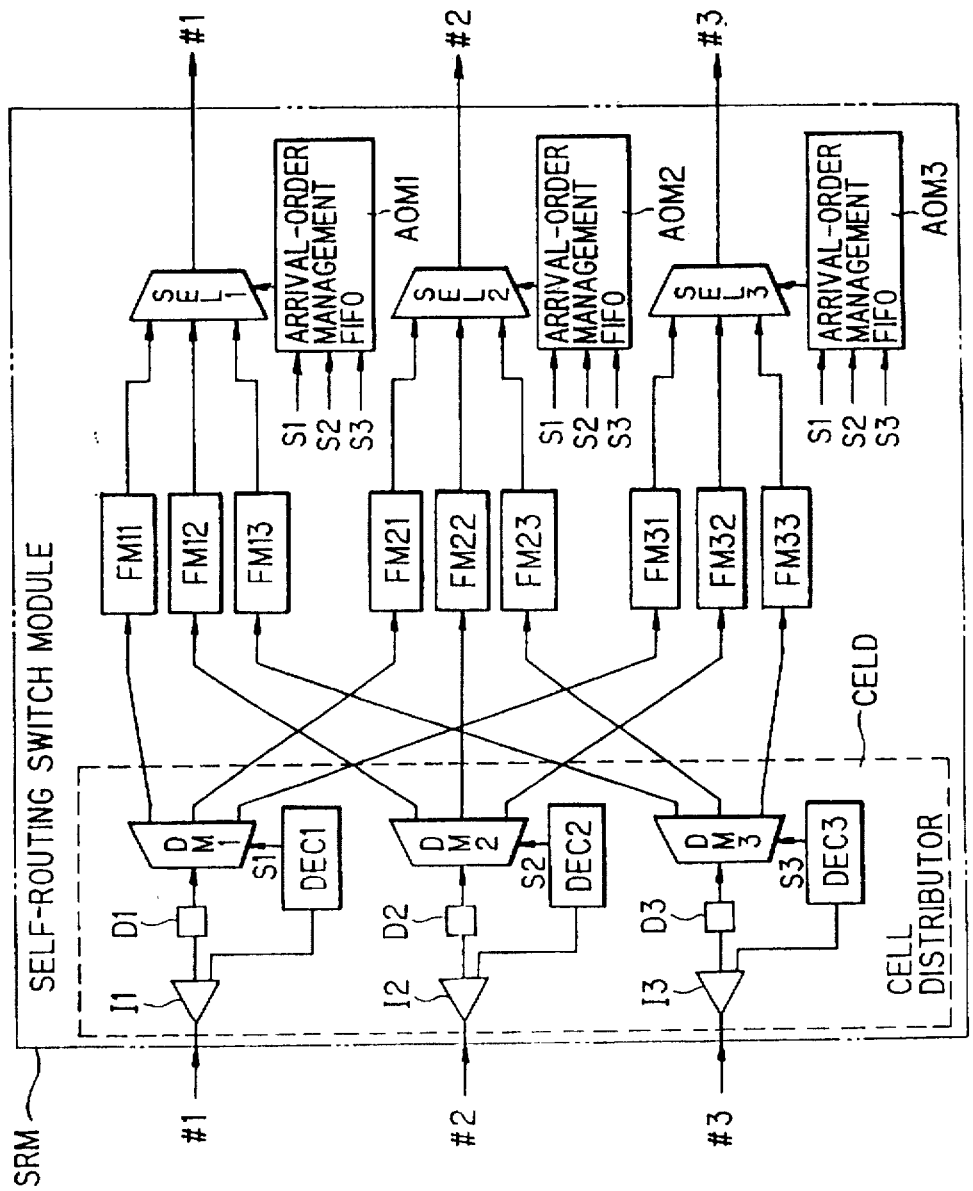
FIG. 22 is a circuit diagram of an example of a self-routing switch module.
Figure 23:
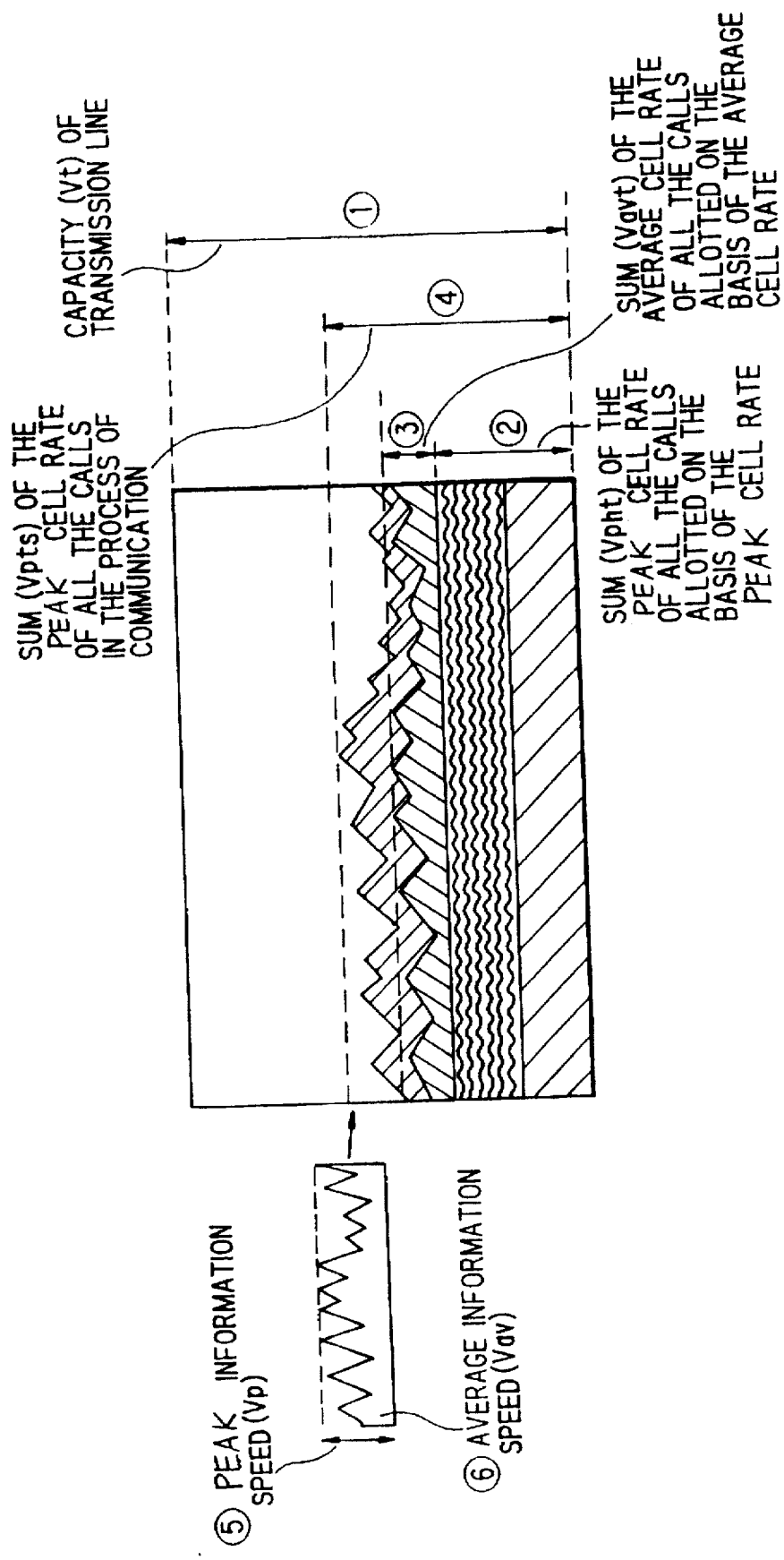
FIG. 23 is an explanatory view of the call reception control.
Figure 24:
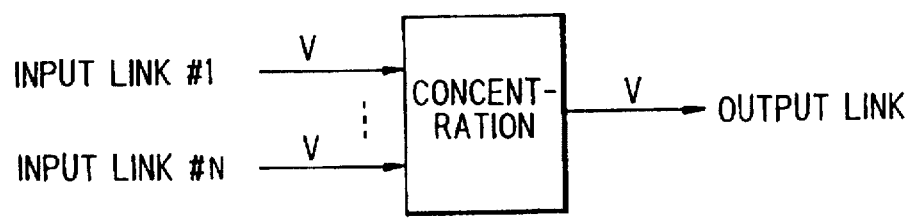
FIG. 24 explains various statistical multiplex systems in comparison with each other.
Figure 25:
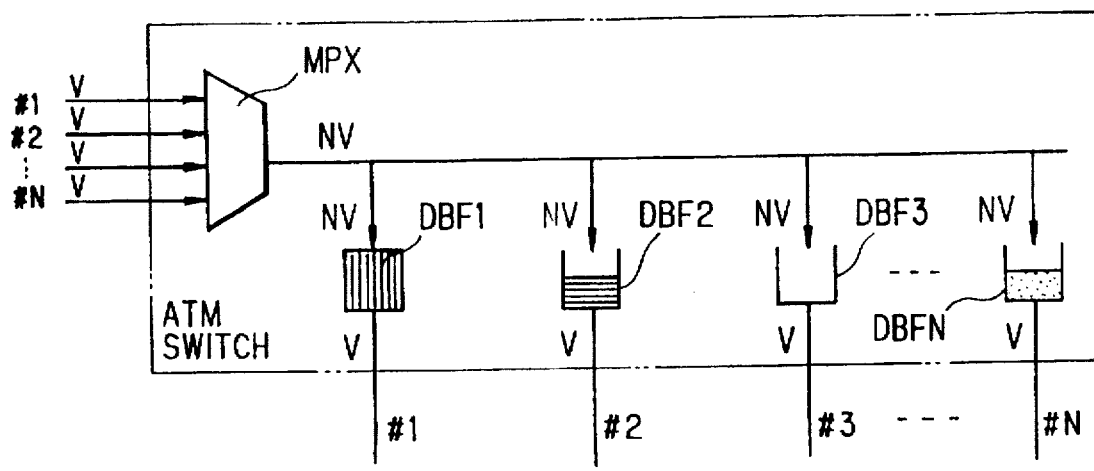
FIG. 25 explains a system in which cells are concentrated and multiplexed before switching.
Figure 26:
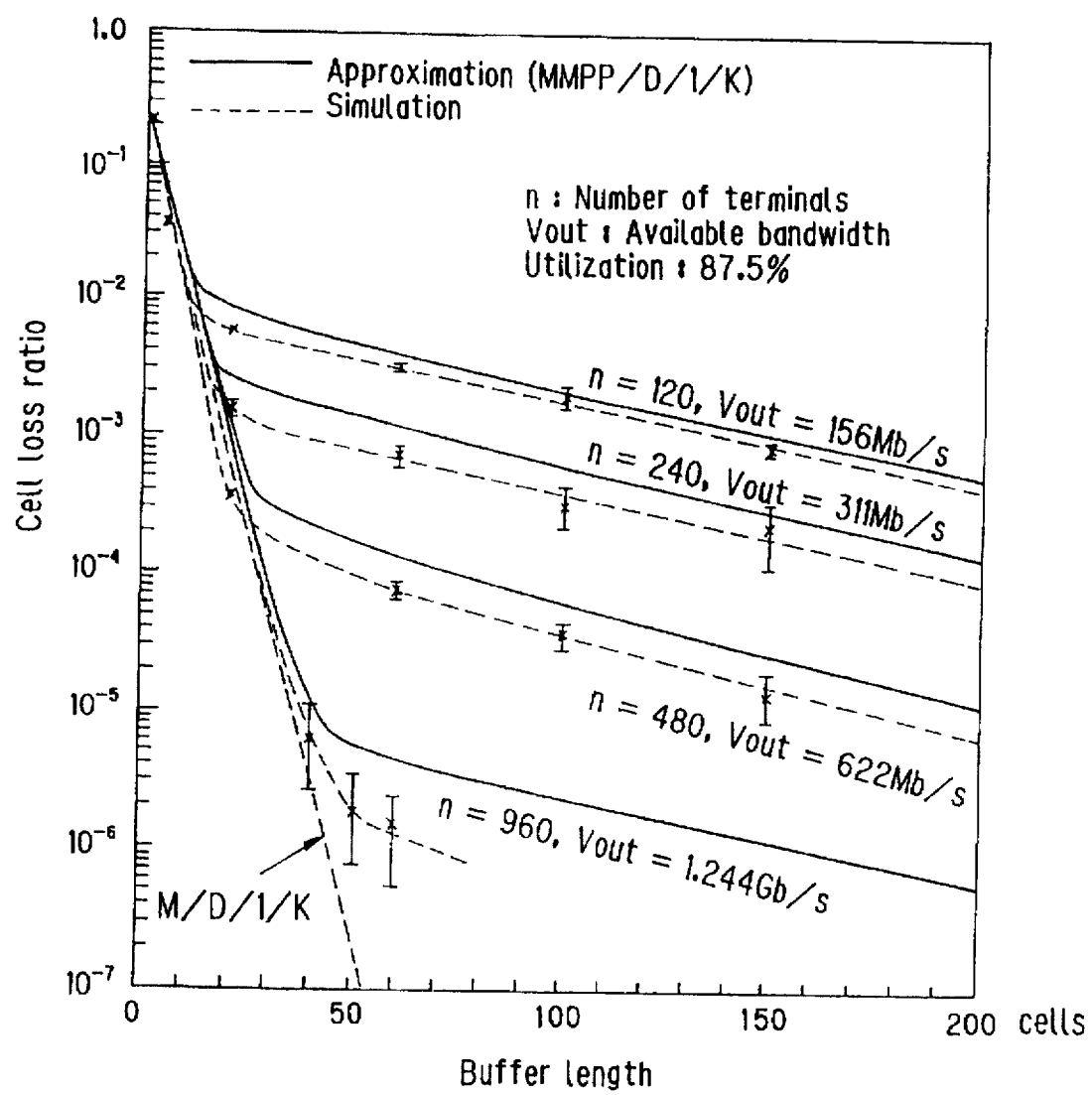
FIG. 26 shows the relationship between log[cell loss ratio] and buffer length.
Figure 27:
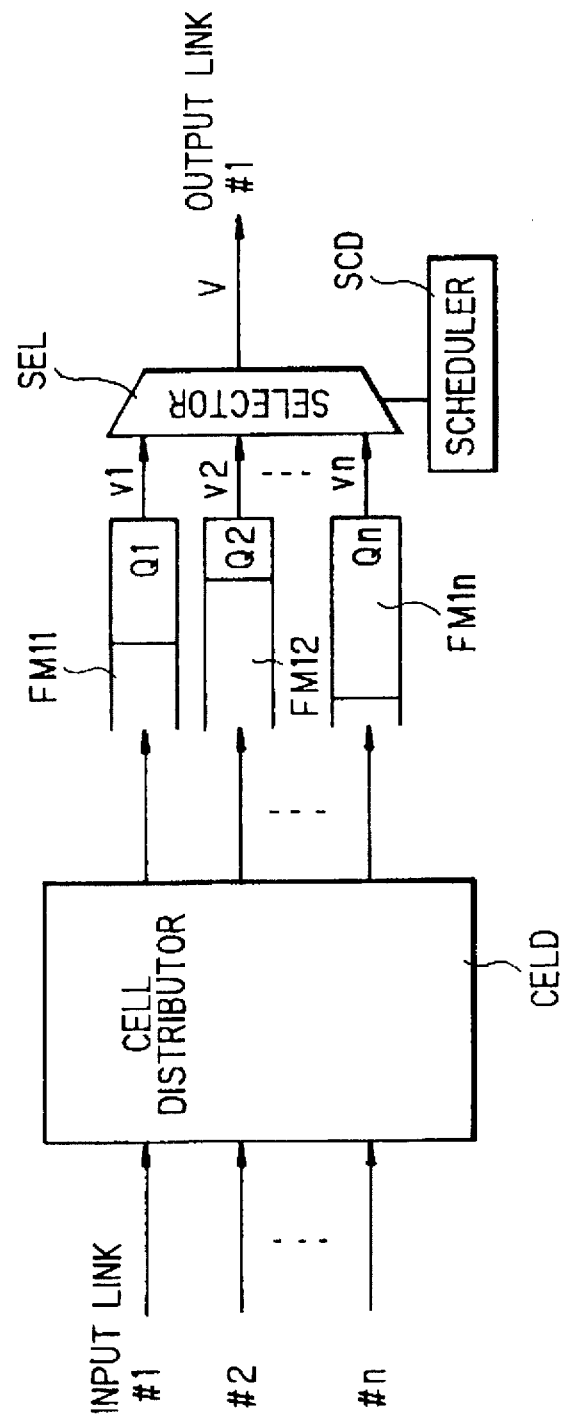
FIG. 27 is an explanatory view of the structure of a traffic shaping system.
Figure 28:
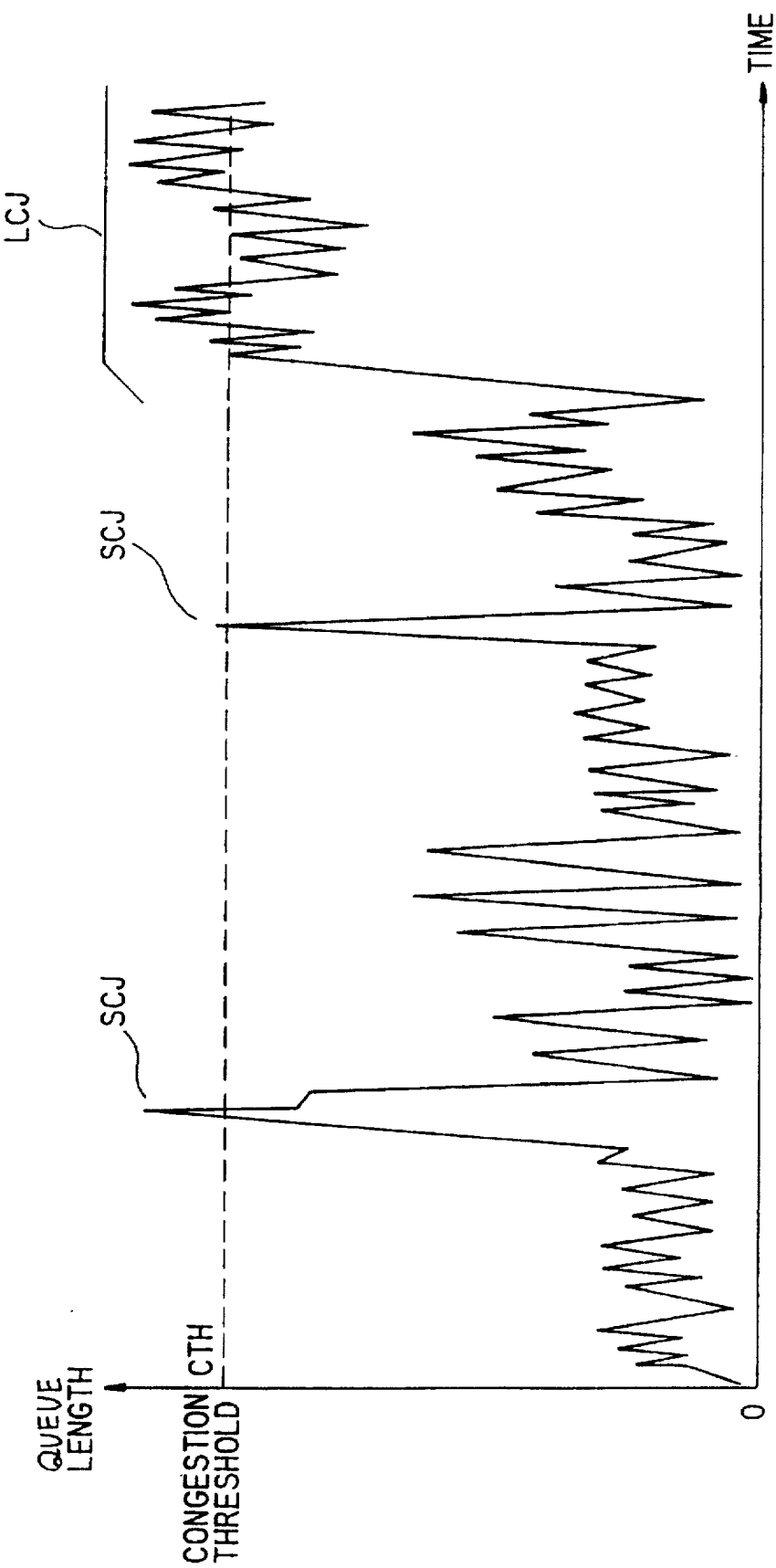
FIG. 28 is an explanatory view of a short-time congestion and a long-term congestion.
Figure 29:
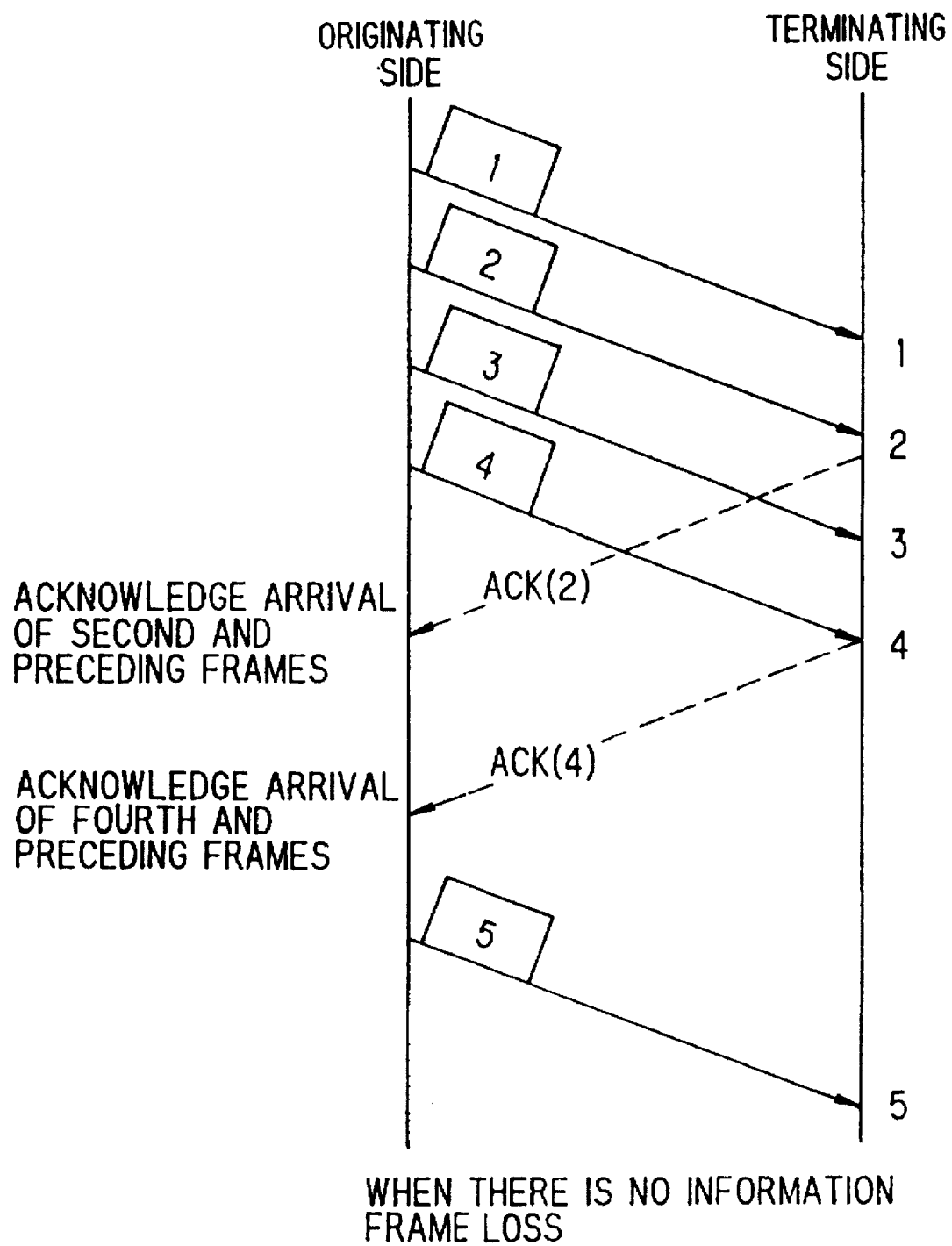
FIG. 29 is an explanatory view of retransmission control (at the normal time)

The reference numeral 111 represents a cell queuing FIFO memory (FIFO buffer) for storing a received ATM cell in a queue and transmitting the stored cell to the corresponding output link. The cell queuing FIFO memory 111 corresponds to the FIFO memory shown in FIG. 22. The reference numeral 121 a congestion/normal state monitor for detecting the occurrence of a long-term congestion which is different from a short-term congestion caused by simultaneous arrival of cells in a normal state, and judging whether or not the normal state is restored from the long-term congestion under congestion avoiding control. The reference numeral 131 represents a congestion avoiding control portion for exerting congestion avoiding control wren a long-term congestion occurs and ending the congestion avoiding control when a normal state is restored from the long-term congestion.

The congestion/normal state monitor 121 uses a threshold $X_{ON}$ which represents the occurrence of a long-term congestion and a threshold $X_{OFF}$ ($X_{ON}>X_{OFF}$) which represents the restoration of a normal state, and judges the fact that the observed value of the actual queue length Y at every predetermined observation time $T_{O1}$ consecutively exceeds the threshold $X_{ON}$ a predetermined number $N_{01}$ ($N_{01} \geq 1$) of times to be the occurrence of a long-term congestion, while judging the fact that the observed value of the actual queue length Y at every predetermined observation time $T_{O2}$ under congestion avoiding control is consecutively below the threshold $X_{OFF}$ a predetermined number $N_{02}$ ($N_{02} \geq 1$) of times to be the restoration to a normal state.

Figure 12:
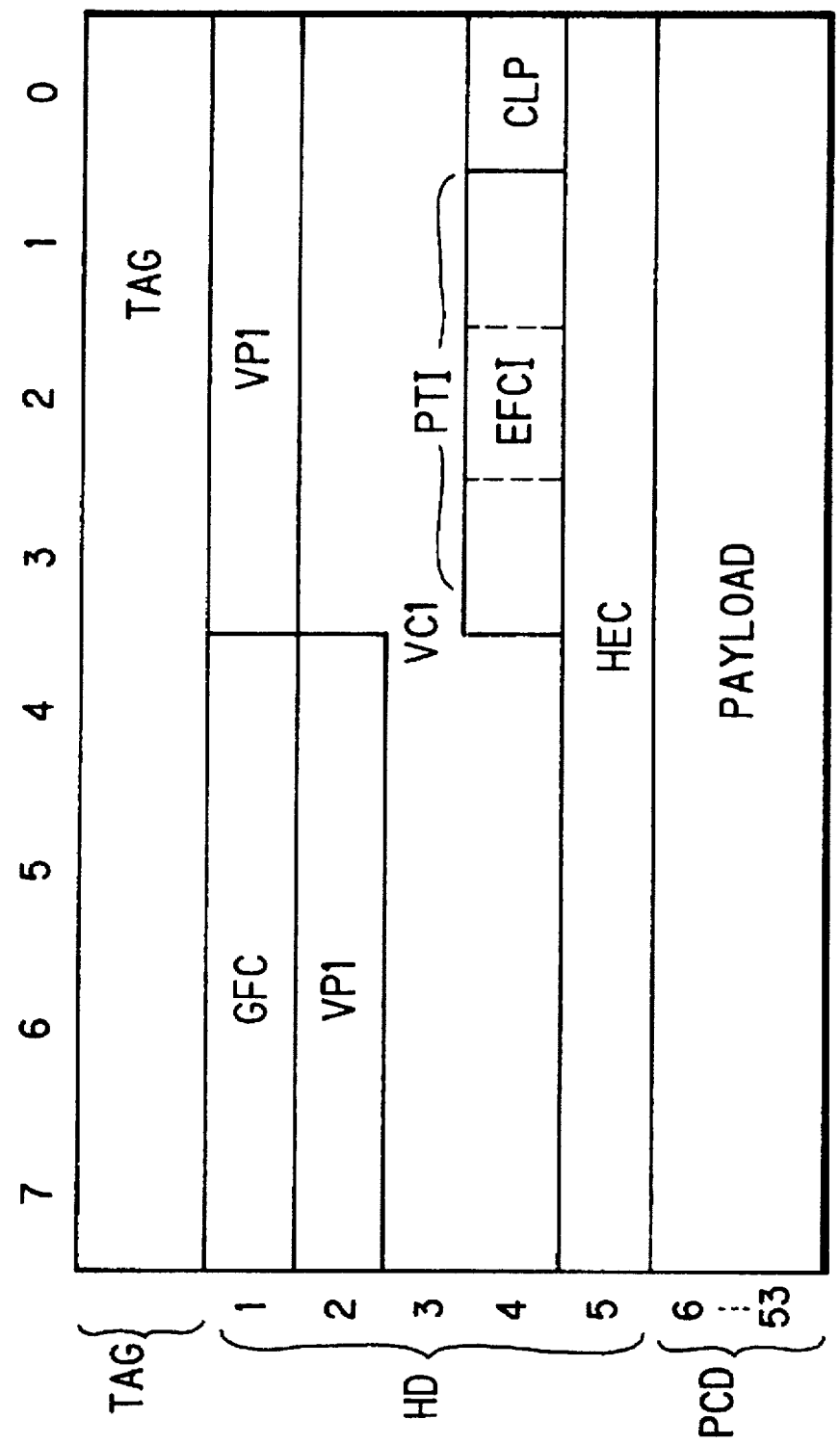
FIG. 12 is an explanatory view of a congestion notifying bit.

In this embodiment, the congestion avoiding control portion 131 is composed of a congestion indicator bit setting portion. The congestion indicator bit setting portion 131 sets a congestion indicator bit referred to as an explicit forward congestion indicator EFCI bit in an ATM cell (see FIG. 12) when transmitting the ATM cell at the time of congestion, while releasing the setting of the explicit forward congestion indicator EFCI bit when transmitting the ATM cell in a normal state. The originating terminal which receives the explicit forward congestion indicator EFCI bit lowers the information transmission rate so as to prevent a cell loss and quickly restore a normal state.

In the congestion/normal state monitor 121, the reference numeral 121a represents a queue length observing portion for observing the number Y of cells (queue length) which remain in the FIFO buffer 111 at a predetermined interval, and 121b a comparator for comparing the observed value with a threshold. The threshold $X_{ON}$ which represents the occurrence of a long-term congestion, the threshold $X_{OFF}$ ($X_{ON}>X_{OFF}$) which represents the restoration of a normal state from a long-term congestion, and the actual queue length Y are input to the comparator 121b, and the comparator 121b compares the observed queue length Y with the threshold $X_{ON}$ at every predetermined observation time $T_{O1}$ in a normal state, and compares the observed queue length Y with the threshold $X_{OFF}$ at every predetermined observation time $T_{O2}$ at the time of a long-term congestion. The reference numeral 121c denotes a counter portion for counting the number N of times Y consecutively becomes $Y \geq X_{ON}$ and the number M of times Y consecutively becomes $Y \leq X_{OFF}$. The reference numeral 121d represents a congestion judging portion for comparing the count number N with a prescribed number $N_{01}$ of times ($N_{01} \geq 1$) and judging that there is a long-term congestion when $N \geq N_{01}$, in other words, when the queue length Y consecutively exceeds the threshold $X_{ON}$ the predetermined number $N_{01}$ of times. The reference numeral 121e represents a normal state judging portion for comparing the count number M with a prescribed number $N_{02}$ of times ($N_{02} \geq 1$) and judging that a normal state is restored, when $M \geq N_{02}$, in other words, when the queue length Y is consecutively below the threshold $X_{OFF}$ the predetermined number $N_{02}$ of times.

The congestion/normal state monitor 121 does not exert control for ending the congestion avoiding control for a preset time $T_{CTRL}$ after the start of the congestion avoiding control. More specifically, the comparator 121b does not compare the observed queue length Y with the threshold $X_{OFF}$ until a predetermined time $T_{CTRL}$ has passed. In this way, it is possible to prevent an oscillation phenomenon that the operations of starting and ending congestion avoiding control are frequently repeated.

(a-2) Operation as a Whole

Figure 13:
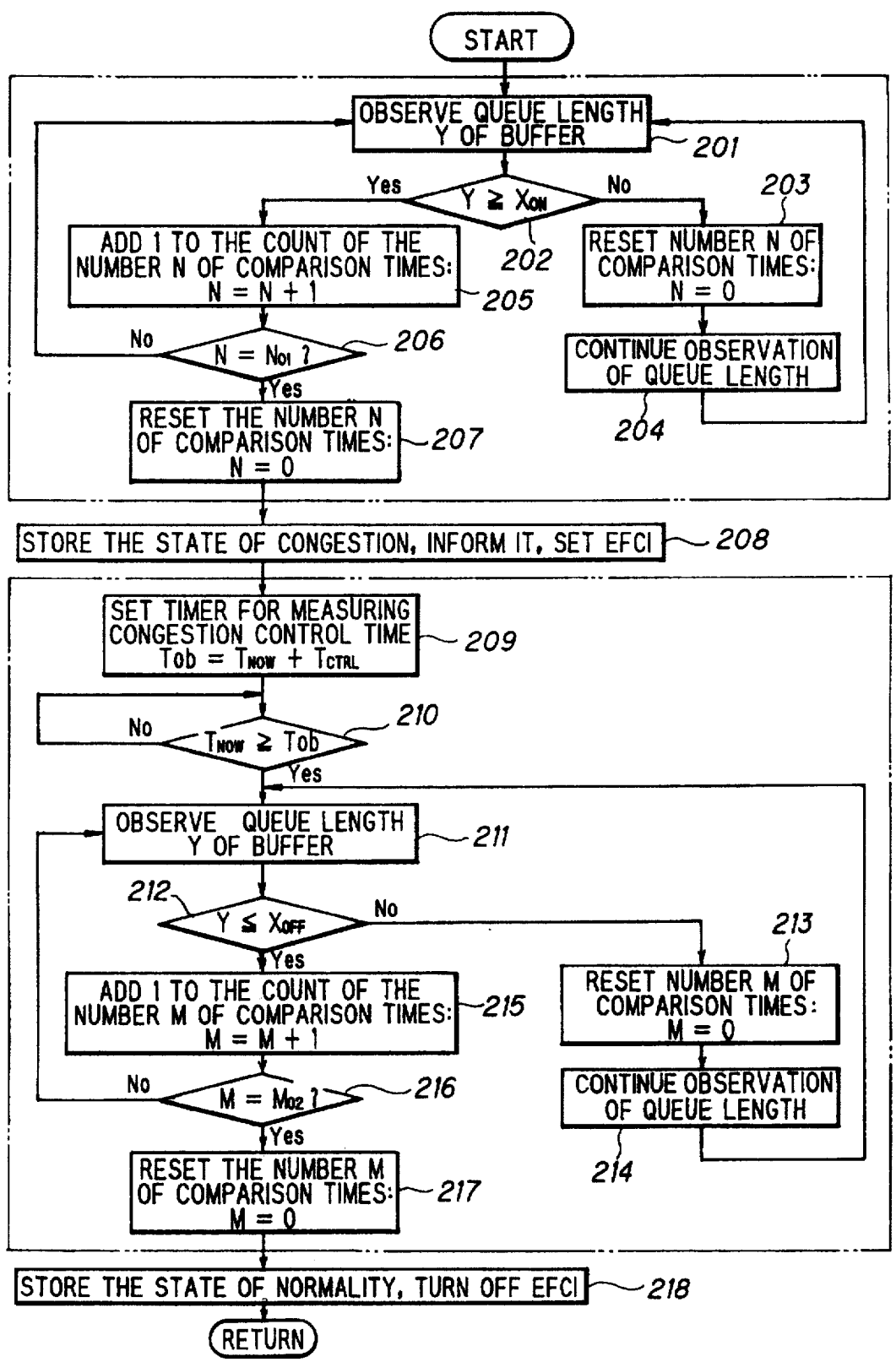
FIG. 13 is a flow chart of a congestion control process.

FIG. 13 is a flow chart of a congestion control process. It is assumed that the ATM network is in a normal state at the initiation.

The congestion/normal state monitor 121 observes the queue length Y of the buffer 111 at every predetermined observation time $T_{O1}$ (step 201), then judges whether or not $Y \geq X_{ON}$ (step 202) and if $Y<X_{ON}$, the congestion/normal state monitor 121 resets the number N of comparison times to 0 and continues the observation of the queue length (steps 203, 204). The process thereafter returns to the step 201.

On the other hand, if $Y \geq X_{ON}$ at the step 202, 1 is added to the count (initial value is 0) number N of times (N+1→N, step 205). Judgement is then made as to whether or not $N=N_{01}$ (step 206), and if $N<N_{01}$, the process returns to the step 201 to repeat the subsequent processing.

However, if $N=N_{01}$, it is judged that a long-term congestion has occurred, and the count number N is cleared to 0

(step 207) and the fact is informed to the congestion indicator bit setting portion 131. The congestion indicator bit setting portion 131 then stores the fact that a long-term congestion has occurred, and turns on the explicit forward congestion indicator EFCI bit of the ATM cell until a normal state is restored (step 208).

Thereafter, the predetermined time $T_{CTRL}$ is added to the current time $T_{NOW}$ so as to calculate the starting time $T_{ob}$ of the processing of judging whether or not a normal state has been restored from the long-term congestion, and the congestion/normal state monitor 121 waits until $T_{NOW}=T_{ob}$ (steps 209 210). When $T_{NOW} \geq T_{ob}$, the congestion/normal state monitor 121 observes the queue length Y of the buffer 111 at every predetermined observation time $T_{02}$ (step 211), then judges whether or not $Y \leq X_{OFF}$ (step 212), and if $Y > X_{OFF}$, the congestion/normal state monitor 121 resets the number M of comparison times to 0 and continues the observation of the queue length (steps 213, 214). The process thereafter returns to the step 211.

On the other hand, if $Y \leq X_{OFF}$ at the step 212, 1 is added to the count (initial value is 0) number M of times (M+1→M, step 215). Judgement is then made as to whether or not $M=N_{02}$ (step 216), and if $M<N_{02}$, the process returns to the step 211 to repeat the subsequent processing.

However, if $M=N_{02}$, it is judged that a normal state has been restored from the long-term congestion, and the count number M is cleared to 0 (step 217) and the fact is informed to the congestion indicator bit setting portion 131. The congestion indicator bit setting portion 131 then stores the fact that a normal state has been restored, and turns off the explicit forward congestion indicator EFCI bit of the ATM cell (step 218).

(b) Second Embodiment

Figure 14:
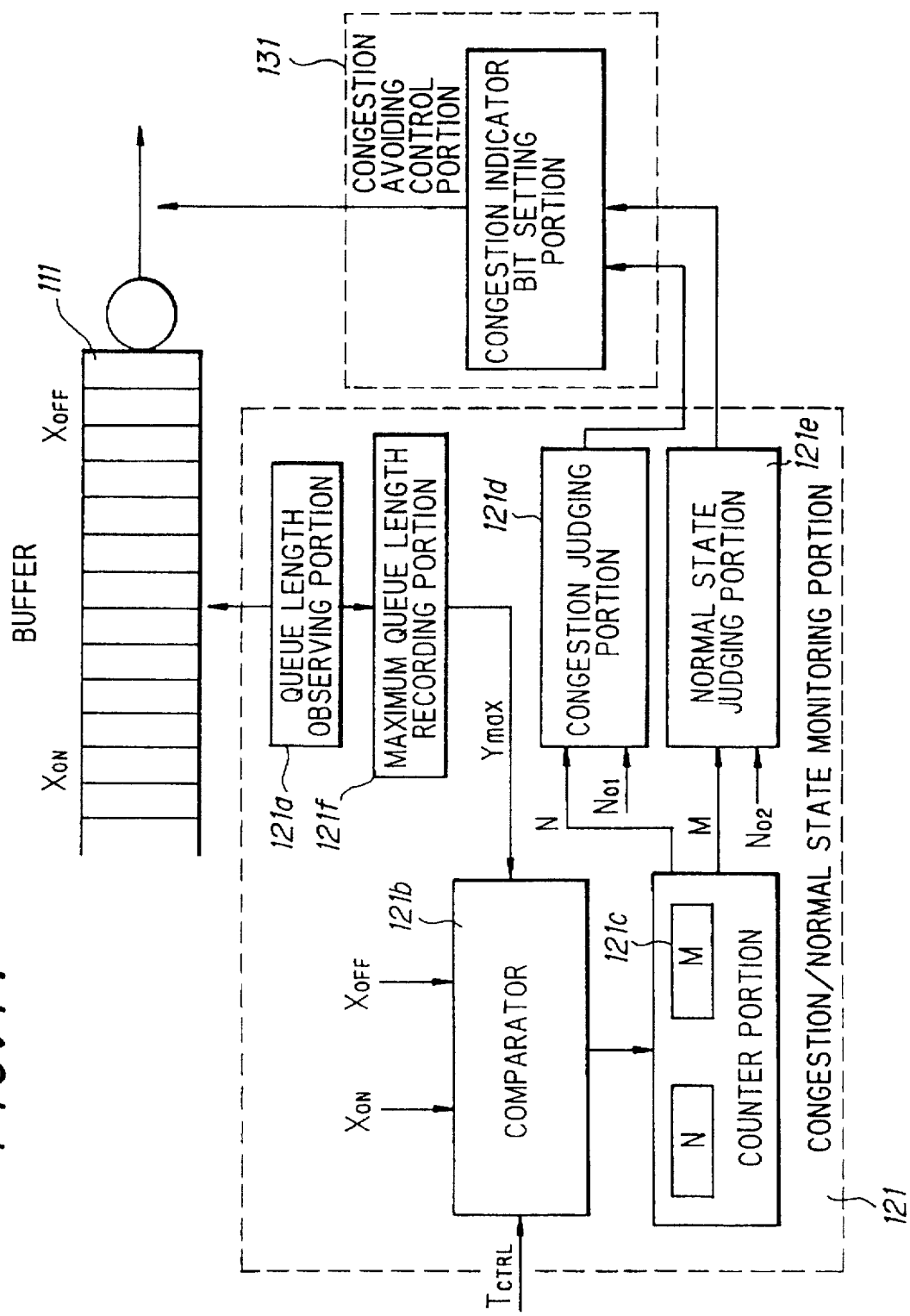
FIG. 14 shows the structure of a second embodiment of congestion control according to the present invention.

FIG. 14 shows the structure of a second embodiment of congestion control. The same reference numerals are provided for the elements which are the same as those in the first embodiment shown in FIG. 11. The reference numeral 121f represents a maximum queue length recording portion for monitoring the maximum queue lengths in the predetermined time $T_{01}$ and the predetermined time $T_{02}$, respectively, and holding the respective maximum queue lengths.

In the first embodiment, the queue lengths Y at the predetermined time $T_{01}$ and the predetermined time $T_{02}$ are compared with the thresholds $X_{ON}$ and $X_{OFF}$, respectively, but in the second embodiment, the maximum queue lengths in the predetermined time $T_{01}$ and in the predetermined time $T_{02}$ are held, and the respective maximum queue lengths are compared with the thresholds $X_{ON}$ and $X_{OFF}$ at every predetermined time $T_{01}$ and at every predetermined time $T_{02}$, respectively.

The threshold $X_{ON}$ which represents the occurrence of a long-term congestion and the threshold $X_{OFF}$ ($X_{ON} > X_{OFF}$) which represents the restoration of a normal state are set in advance. The queue length observing portion 121a of the congestion/normal state monitoring means 121 observes the queue length for the predetermined observation time $T_{01}$ and the maximum queue length recording portion 121f holds the maximum queue length $Y_{max}$ in that period. The comparator 121b, the counter portion 121c and the congestion judging portion 121d judge the fact that the maximum queue length read out of the maximum queue length recording portion 121f at every predetermined observation time $T_{01}$ consecutively exceeds the threshold $X_{ON}$ the predetermined number $N_{01}$ ($N_{01} \geq 1$) of times to be the occurrence of a long-term congestion.

While congestion avoiding control is executed, the queue length observing portion 121a observes the queue length for the predetermined observation time $T_{02}$ and the maximum queue length recording portion 121f holds the maximum queue length $Y_{max}$ in that period. The comparator 121b, the counter portion 121c and the normal state judging portion 121e judge the fact that the maximum queue length read out of the maximum queue length recording portion 121f at every predetermined observation time $T_{02}$ is consecutively below the threshold $X_{OFF}$ the predetermined number $N_{02}$ ($N_{02} \geq 1$) of times to be the restoration to a normal state.

As described above, according to the first and second embodiments, it is possible to discriminate a long-term congestion from a short-term congestion and securely detect a long-term congestion by a simple structure. It is also possible to quickly restore a normal state by congestion avoiding control. In addition, it is possible to avoid an oscillation phenomenon that the operations of starting and ending congestion avoiding control are frequently repeated by inhibiting the control for ending the congestion avoiding control for the predetermined time $T_{CTRL}$ after the start of the congestion avoiding control.

In a conventional system with a threshold provided in a buffer, the difficulty in determining the threshold with the form of information flowing into the buffer taken into consideration is a problem. According to these embodiments, it is possible to obviate the difficulty because it is possible to take the form of information flowing into the buffer into consideration by comparing the queue length or the maximum queue length observed at every predetermined time with a threshold a predetermined number of times.

(c) Congestion Notice and Congestion Avoiding Control

Figure 15:
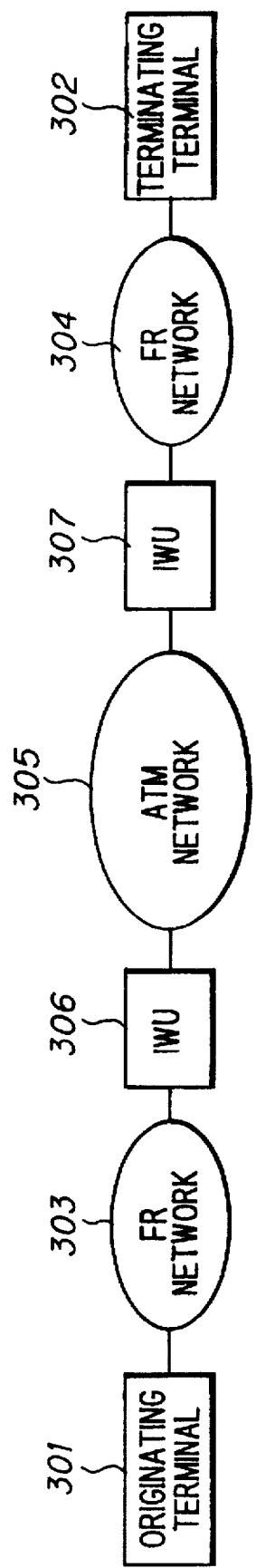
FIG. 15 shows the structure of a network to which the present invention is applicable.

A long-term congestion occurs when an ATM network is utilized as a relay network of communication networks such as frame relay networks. FIG. 15 shows the structure of such a network. The reference numeral 301 denotes a originating terminal, 302 a terminating terminal, 303 and 304 frame relay networks (FR networks), 305 an ATM network as a relay network, and 306 and 307 inter-network units which serve as interfaces between different networks.

Figure 30:
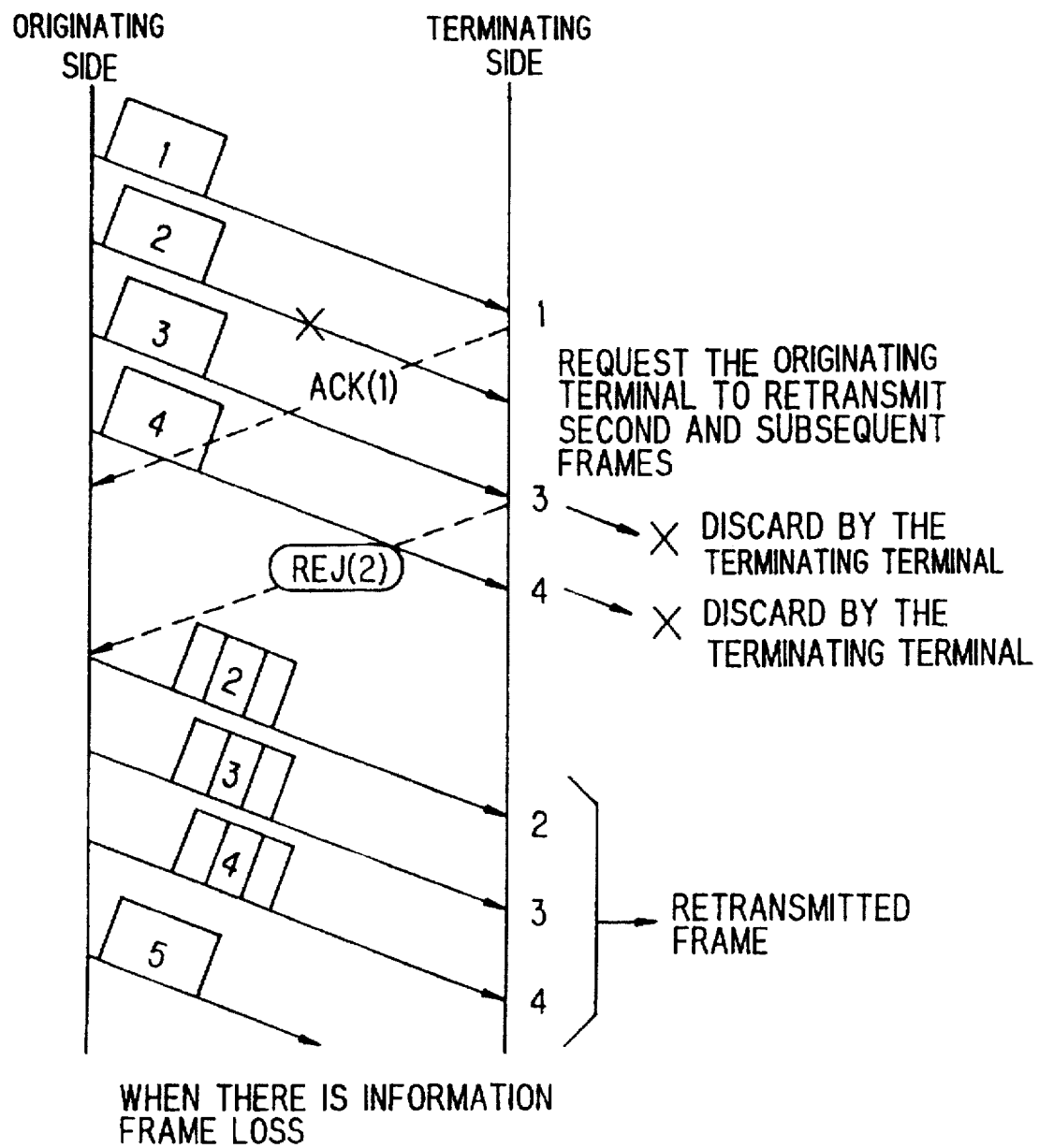
FIG. 30 is an explanatory view of retransmission control (when cell loss is caused).

In such a network, when a cell loss is caused in the ATM network 305, it is impossible to set up a frame in the frame relay networks 303, 304, so that the frames are lost. In other words, a frame loss is caused. When such a frame loss is caused, retransmission control is executed, as explained in FIG. 30. When a plurality of lines simultaneously execute retransmission control, the congestion is deteriorated due to an increase in the load, which leads to a long-term congestion.

To prevent this, when a long-term congestion is detected in the network, it is necessary to inform the originating terminal 301 of the long-term congestion so as to lower the frame transmission rate in order to restore a normal state.

Figure 16:
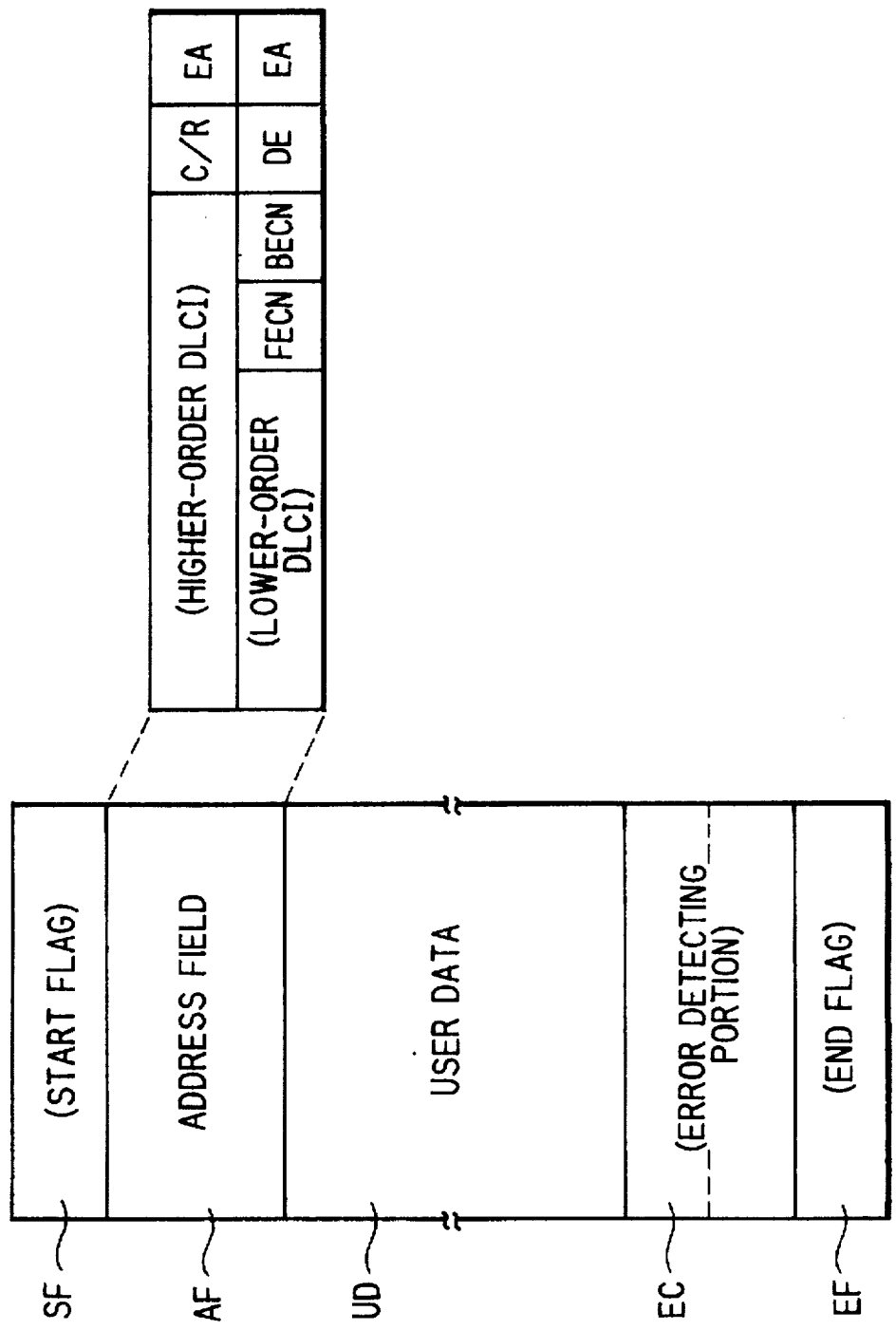
FIG. 16 shows the structure of a frame used in the frame relay network.

FIG. 16 shows the structure of an FR frame. The symbol SF denotes a start flag portion, AF an address field portion (frame header portion), UD a user data portion, EC an error detecting portion, and EF an end flag. The address field AF is composed of, for example, 2 bytes, and includes a data link connection identifier DLCI which indicates the destination, a command/response indicator bit C/R, an address field extension EA bit, a forward congestion notice FECN bit for notifying a congestion in the forward direction (from the network to the destination), a backward congestion notice BECN bit for notifying a congestion in the backward direction (from the network to the originating terminal), and a discardable frame indicator DE bit.

Figure 17:
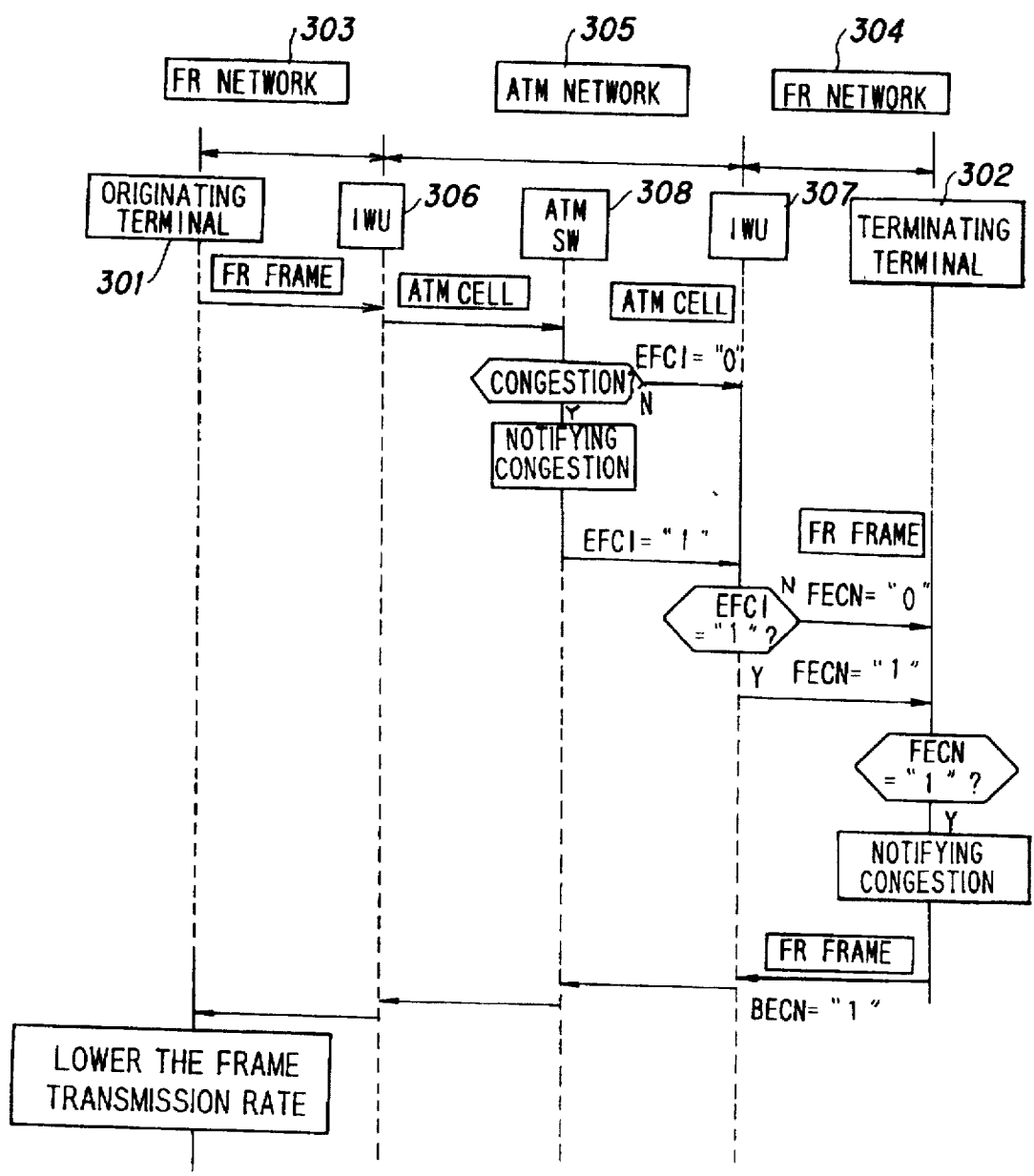
FIG. 17 explains a congestion notifying process.
Figure 18:
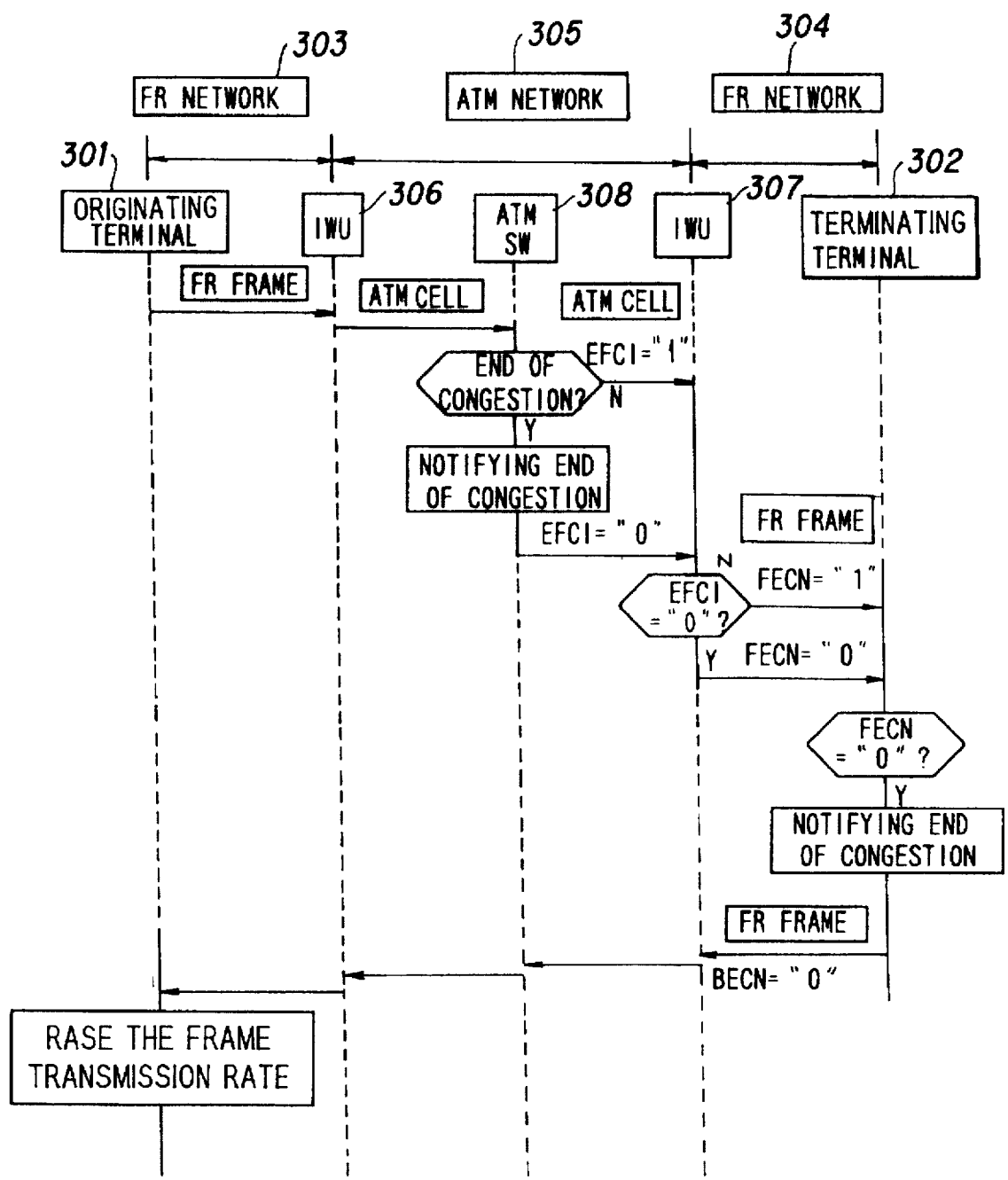
FIG. 18 explains a normal state restoration notifying process.
Figure 19:
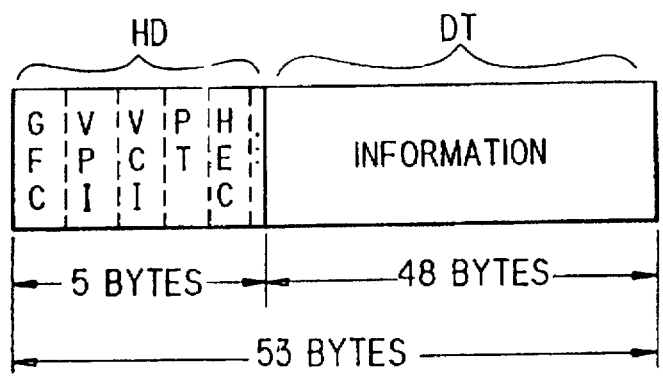
FIG. 19 shows the structure of an ATM cell.
Figure 20:
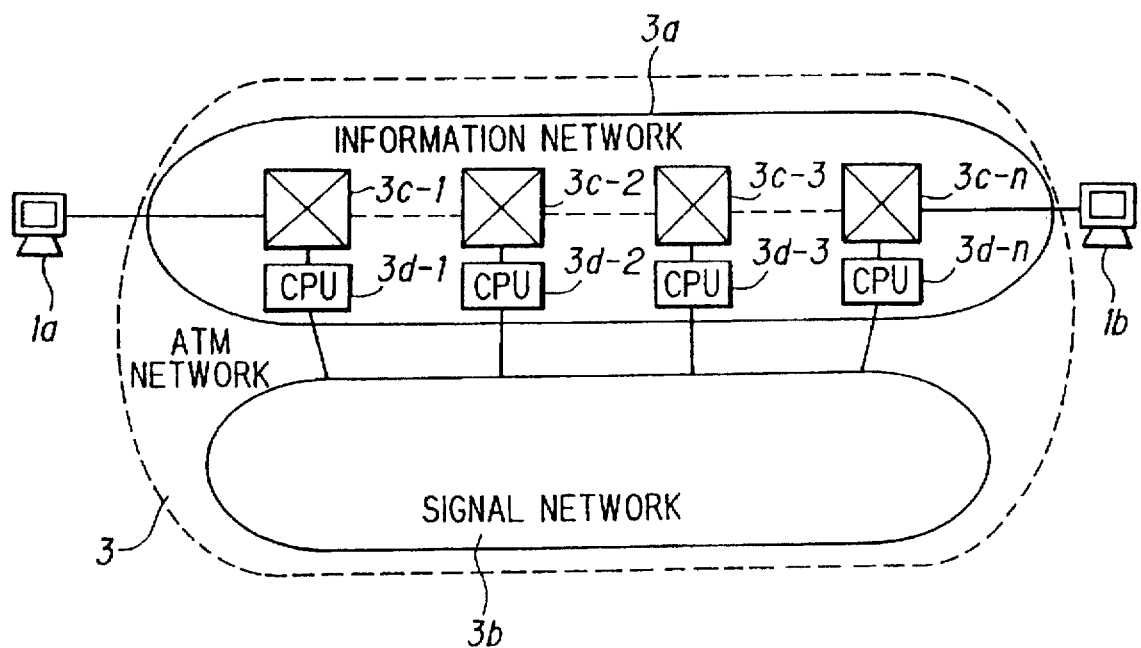
FIG. 20 schematically explains the structure of an ATM network.
Figure 21:
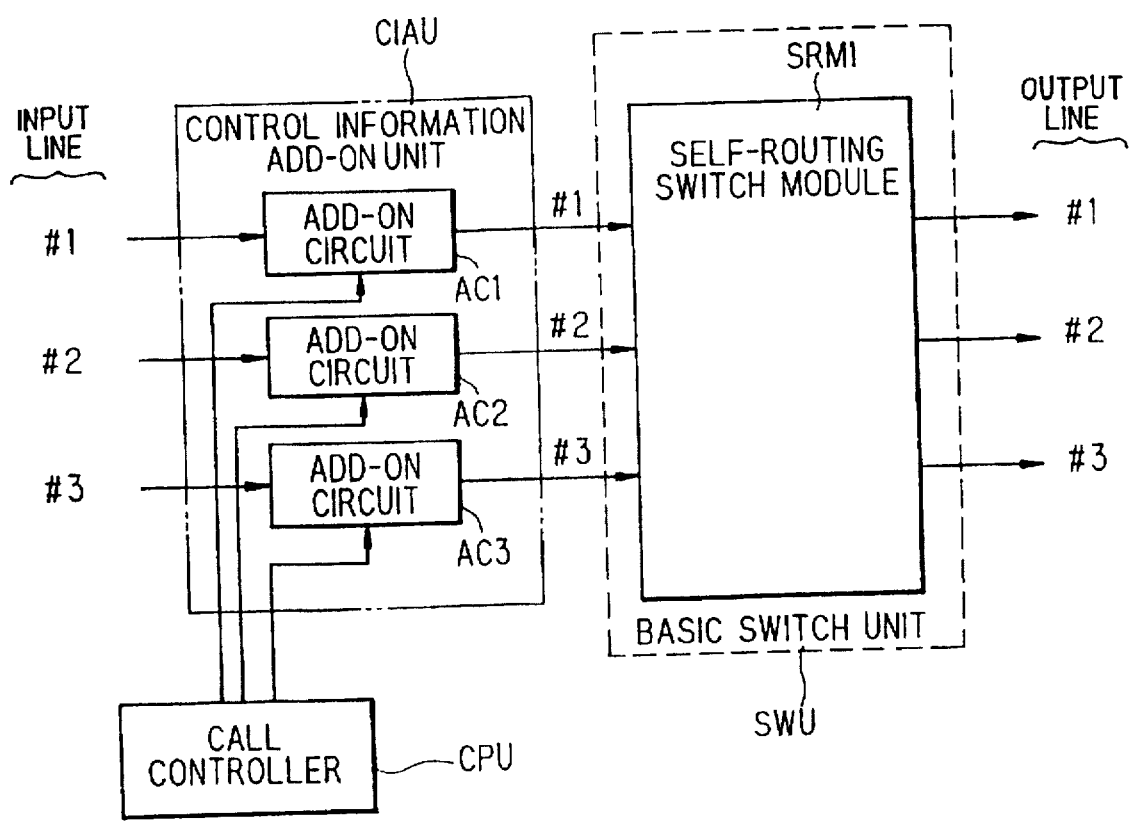
FIG. 21 shows the structure of a self-routing ATM exchange.

FIGS. 17 and 18 explain a congestion notifying process and a normal state restoration notifying process.

The originating terminal 301 transmits a frame to the frame relay network 303, and the frame relay network 303 transmits the frame to the inter-network unit 306. The inter-network unit 306 analyzes the frame and assembles an ATM cell and transmits the ATM cell to the ATM network 305. The ATM switch 308 of the ATM network judges whether or not a long-term congestion has occurred by the above-described method, and if the ATM network is judged to be normal, the ATM switch 308 transfers the explicit forward congestion indicator EFCI bit as it is ("0"). On the other hand, if a long-term congestion is detected, the ATM switch 308 sets the explicit forward congestion indicator EFCI bit to "1" before transferring the ATM cell.

When the inter-network unit 307 receives the ATM cell, it analyzes the ATM cell so as to assemble a frame, and judges whether or not the EFCI bit is off ("0", normal state). If the EFCI bit is off (normal state), the FECN bit in the frame is set to "0". On the other hand, if the EFCI bit is on ("1", a long-term congestion), the FECN bit in the frame is set to "1" so as to notify the occurrence of a long-term congestion. The terminating terminal 302 judges whether or not the EFCI bit is "1", it transmits the frame with BECN="1" backward to the originating terminal 301, if the EFCI bit is "1". When the originating terminal receives the frame having BECN=1, it recognizes that a long-term congestion has occurred in the ATM network, and lowers the frame transmission rate. Since such control is executed for each communication, the long-term congestion in the ATM network is ameliorated and a normal state is quickly restored.

If the ATM network restores a normal state, the explicit forward congestion indicator EFCI bit of the ATM cell is turned off (="0"), and the FECN bit of the frame becomes "0", so that the terminating terminal 302 transmits the frame with BECN=0 to the originating terminal 301. When the originating terminal 301 receives the frame having BECN= 0, it recognizes that the ATM network has restored a normal state, and gradually raises the frame transmission rate to the original rate.

While there has been described what are at present considered to be preferred embodiments of the invention, it will be understood that various modifications may be made thereto, and it is intended that the appended claims cover all such modifications as fall within the true spirit and scope of the invention.

As described above, the scheduler allocates the predetermined number of time slots which correspond to a required bandwidth to a bandwidth-guaranteed connection call from among the N time slots which constitute one period, and schedules so that an ATM cell is read from the corresponding buffer at an allocated time slot and that it is transmitted to the output link. The non-bandwidth-guaranteed cell transmitting means reads an ATM cell of the non-bandwidth guaranteed connection call from the corresponding buffer and transmits it to the output link at a time slot which is not allocated to any bandwidth-guaranteed connection call. Therefore, according to the present invention, an ATM exchange can utilize both a statistical multiplex system and a traffic shaping system to have the respective merits. In other words, by decisively allocating a necessary bandwidth to a bandwidth-guaranteed connection call which is required to have a predetermined QOS, it is possible to transmit ATM cells having such a quality to an output link. On the other hand, it is possible to transmit ATM cells of a non-bandwidth-guaranteed connection call to the output link in such a manner as to enhance the utilization of the output link.

The scheduler allocates the number of time slots which correspond to the required bandwidth for each bandwidth-guaranteed connection call and enters the number of an input link which accommodates the call in the allocated time slots. The scheduler schedules so that cells are read from the buffers which correspond to the input link at the allocated time slots and that they are transmitted to the output link. Accordingly, it is possible to decisively allocate a necessary bandwidth for each connection or each input link and to transmit ATM cells, thereby maintaining a predetermined QOS.

Furthermore, the ATM exchange is also provided with a shared buffer for storing ATM cells which arrive from one input link at a multiplex speed of N·V, and address management buffers corresponding to respective quality class numbers for specifying the quality conditions. The addresses in the shared buffer for storing ATM cells are queued in the address management buffers which correspond to the quality class numbers of the ATM cells. With respect to a bandwidth-guaranteed connection call, the scheduler allocates the number of time slots which correspond to the required bandwidth which is necessary for satisfying the quality class of the call and enters the quality class number in the corresponding allocated slots. In this state, the scheduler schedules so that the address is read from the address management buffer designated by the quality class number at each time slot and that an ATM cell is read from the shared buffer on the basis of the read address and transmitted to the output link. According to this structure, it is possible to decisively allocate the necessary bandwidth for each quality class and transmit ATM cells, thereby maintaining a predetermined QOS.

According to the present invention, the time slots which are not allocated to any bandwidth-guaranteed connection call are divided into ① time slots at which ATM cells of a non-bandwidth-guaranteed connection call can be transmitted and ② time slots at which ATM cells cannot be transmitted, and ATM cells of a non-bandwidth-guaranteed connection call are transmitted only at the time slots at which ATM cells can be transmitted. It is therefore possible to regulate the allocation of a bandwidth to a non-bandwidth-guaranteed connection call so as not to exceed a predetermined bandwidth. It is also possible to efficiently transmit cells of a non-bandwidth-guaranteed connection call in the order of arrival in accordance with the cross-point buffer system by FIFO read control.

In addition, according to the present invention, the queue length Qi of a shared buffer which should be maintained in order to satisfy the quality conditions of all calls having the same quality class number #i is computed, and a threshold is set at the value obtained by subtracting the queue length Qi (i=1, 2, ...) of all the quality classes from a shared buffer length B. When the number of cells of a non-bandwidth-guaranteed connection call stored in the shared buffer becomes equal to the threshold, it is thereafter inhibited to write ATM cells of a non-bandwidth-guaranteed connection call into the shared buffer. Due to this structure, it is possible to acquire a necessary bandwidth for the bandwidth-guaranteed connection call even if ATM cells of a non-bandwidth-guaranteed connection call frequently reach.

According to the present invention, the queue length Qi in a shared buffer which should be maintained in order to satisfy the quality conditions of a quality class #i is obtained for each quality class, and the number of ATM cells of the bandwidth-guaranteed connection calls having a predetermined quality class number #i which remain in the shared buffer is monitored for each quality class number. When the number of remaining cells is equal to the queue length Qi, the ATM cell of a bandwidth-guaranteed connection call having the quality class number #i which reaches next is discarded. Due to this structure, it is possible to acquire the bandwidth so as to securely maintain the qualities of all the quality classes even if many cells having a specific quality class number reach.

According to the present invention, the occurrence of a long-term congestion which is different from a short-term congestion caused by simultaneous arrival of cells is detected, and whether or not a normal state is restored from the congestion is judged under congestion avoiding control. Since congestion avoiding control is exerted at the occurrence of a long-term congestion, and it is ended when a normal state is restored from the congestion, it is possible to detect a long-term congestion discriminated from a short-term congestion and quickly restore a normal state.

Furthermore, according to the present invention, it is possible to avoid an oscillation phenomenon that the operations of starting and ending congestion avoiding control are frequently repeated by inhibiting control for ending congestion avoiding control for a predetermined time after the start of the congestion avoiding control.

In the present invention, a threshold $X_{ON}$ which represents the occurrence of a long-term congestion and a threshold $X_{OFF}$ ($X_{ON} > X_{OFF}$) which represents the restoration of a normal state are set in advance. The congestion/normal state monitoring means judges the fact that the observed value of the queue length at every predetermined observation time $T_{O1}$ consecutively exceeds the threshold $X_{ON}$ a predetermined number $N_{O1}$ ($N_{O1} \geq 1$) of times to be the occurrence of a long-term congestion, while judging the fact that the observed value of the queue length at every predetermined observation time $T_{O2}$ under congestion avoiding control is consecutively below the threshold $X_{OFF}$ a predetermined number $N_{O2}$ ($N_{O2} \geq 1$) of times to be the restoration to a normal state. Alternatively, the congestion/normal state monitoring means 121 judges the fact that the maximum queue length of the buffer in every predetermined observation time $T_{O1}$ consecutively exceeds the threshold $X_{ON}$ a predetermined number $N_{O1}$ ($N_{O1} \geq 1$) of times to be the occurrence of a long-term congestion, while judging the fact that the maximum queue length in every predetermined observation time $T_{O2}$ under congestion avoiding control is consecutively below the threshold $X_{OFF}$ a predetermined number $N_{O2}$ ($N_{O2} \geq 1$) of times to be the restoration to a normal state.

According to this structure, it is possible to discriminate a long-term congestion from a short-term congestion and securely detect a long-term congestion by a simple structure. It is also possible to quickly restore a normal state by congestion avoiding control. In addition, it is possible to avoid an oscillation phenomenon that the operations of starting and ending congestion avoiding control are frequently repeated by inhibiting the control for ending the congestion avoiding control for a predetermined time $T_{CTRL}$ after the start of the congestion avoiding control.

In addition, according to the present invention, it is possible to obviate the difficulty in determining a threshold with the form of information flowing into a buffer taken into consideration, which is a problem in a conventional system with the threshold provided in the buffer, by observing a change in the queue length.

We claim:

1. An ATM exchange for transmitting ATM cells which arrive from an input link to an output link, comprising:

in a case where there are simultaneously both bandwidth-guaranteed connection call which includes a required bandwidth to be guaranteed and non-bandwidth-guaranteed connection call which does not require a bandwidth to be guaranteed and information of which may be transmitted when no information of said bandwidth-guaranteed connection call is transmitted, a scheduler for allocating the number of time slots which correspond to said required bandwidth of said bandwidth-guaranteed connection call from among the N time slots which constitute one period, and scheduling so as to transmit ATM cell at each allocated time slot; and a non-bandwidth-guaranteed cell transmitting means for transmitting ATM cells of said non-bandwidth-guaranteed connection call at time slots which are not allocated to any bandwidth-guaranteed connection call.

2. An ATM exchange according to claim 1, wherein said scheduler divides said time slots which are not allocated to any bandwidth-guaranteed connection call into time slots at which ATM cells of said non-bandwidth-guaranteed connection call can be transmitted and time slots at which said ATM cells cannot be transmitted and said non-bandwidth-guaranteed cell transmitting means transmits ATM cells of said non-bandwidth-guaranteed connection call only at said time slots at which ATM cells of said no-bandwidth guaranteed connection call can be transmitted.

3. An ATM exchange according to claim 1, wherein said non-bandwidth-guaranteed cell transmitting means transmits ATM cells of said non-bandwidth-guaranteed connection call in the order of arrival.

4. An ATM exchange for transmitting ATM cells which arrive from an input link to an output link, comprising:

in a case where there are simultaneously both a bandwidth-guaranteed connection call which requires a bandwidth to be guaranteed and a non-bandwidth-guaranteed connection call which does not require a bandwidth to be guaranteed and information of which may be transmitted when no information of said bandwidth-guaranteed connection call is transmitted, a tag adding portions provided for each input link so as to attach a tag including routing information and information indicating whether an ATM cell belongs to said bandwidth-guaranteed connection call or said non-bandwidth-guaranteed connection call to a received ATM cell, a buffer provided for each input link so as to store an ATM cell in a queue which is to be transmitted to an output link;

an arrival-order management memory for storing the data which specify the buffers for storing the ATM cells of said non-bandwidth-guaranteed connection call in the order of arrival;

a scheduling table in which the number of time slots which correspond to the required bandwidth of said bandwidth-guaranteed connection call are allocated to said bandwidth-guaranteed connection call from among M time slots which constitute one period, the number of an input link for accommodating said bandwidth-guaranteed connection call is entered in the allocated time slots, and "vacant" is entered in a time slot which is not allocated to any bandwidth-guaranteed connection call; and an ATM cell transmission control portion for reading an input link number corresponding to a time slot from said scheduling table at every time slot, and transmitting an ATM cell from the buffer which is designated by said input link number to the output link when said input link number is entered in said time slot, while reading an ATM cell from the buffer which is designated by the data extracted from the head of said arrival-order management memory and transmitting said ATM cell to said output link when no input link number is written in said time slot.

5. An ATM exchange according to claim 4, wherein said time slots which are not allocated to any bandwidth-guaranteed connection call are divided into time slots at which ATM cells of said non-bandwidth-guaranteed connection call can be transmitted and time slots at which said ATM cells of said non-bandwidth guaranteed connection call cannot be transmitted, and the classification is entered in said scheduling table; and said ATM cell transmission control portion transmits ATM cells of said non-bandwidth-guaranteed connection call only at said time slots at which ATM cells of said non-bandwidth-guaranteed connection call can be transmitted.

6. An ATM exchange for transmitting ATM cells which arrive from an input link to an output link, comprising:

in a case where there are simultaneously both a bandwidth-guaranteed connection call which require a bandwidth to be guaranteed and a non-bandwidth-guaranteed connection call which does not require a bandwidth to be guaranteed and information of which may be transmitted when no information of said bandwidth-guaranteed connection call is transmitted, a shared buffer for storing ATM cells which arrive from one input link at a multiplex speed of N V, wherein N is the number of input links and V is the speed at which the ATM cells arrive at the shared buffer;

an address management buffer provided in correspondence with each quality class for specifying the quality conditions so as to store in a queue the addresses of said shared buffer in which ATM cells having the quality class number of said quality class are stored;

a means for identifying an ATM cell of said non-bandwidth-guaranteed connection call be reference to information attached to said ATM cell so as to indicate whether said ATM cell belongs to said bandwidth-guaranteed connection call or said non-bandwidth-guaranteed connection call;

an arrival-order management memory for storing the quality call numbers attached to ATM cells of said non-bandwidth-guaranteed connection call in the order of arrival;

a scheduling table in which the number of time slots which guarantee the quality of each quality class are allocated to said each quality class from among M time slots which constitute one period, the quality class number of each quality class is entered in the allocated time slots, and "vacant" is entered in a time slot which is not allocated to any quality class;

a shared buffer address management mechanism for reading a quality class number corresponding to a time slot from said scheduling table at every time slot, and reading an address from the address management buffer which is designated by said quality class number when said quality class number is entered in said time slot, while reading an address from the buffer which is designated by the quality class number extracted from the head of said arrival-order management memory when no quality class number is entered in said time slot; and a data read control portion for reading the ATM cell from the shared buffer on the basis of said address read from the shared buffer and outputting it.

7. An ATM exchange according to claim 6, further comprising:

a means for obtaining the queue length Qi in said shared buffer which should be maintained in order to satisfy the quality conditions of all calls having the same quality class number as that of a new bandwidth-guaranteed connection call and setting a threshold at the value obtained by subtracting said queue length Qi (i=1, 2, . . . ) of all the quality classes from a shared buffer length B, when said new bandwidth-guaranteed connection call is accepted; and a means for inhibiting any ATM cell of said non-bandwidth-guaranteed connection call from being written into said shared buffer and a quality class number from being stored in said arrival-order management FIFO memory when the number of quality class numbers stored in said arrival-order management FIFO memory becomes equal to said threshold.

8. An ATM exchange according to claim 6, further comprising:

a means for obtaining the queue length Qi in said shared buffer which should be maintained in order to satisfy the quality conditions of all calls having the same quality class number for each quality class number; and a means for monitoring the number of ATM cells of said bandwidth-guaranteed connection call having the same quality class number which are stored in said shared buffer for each quality class number, and discarding the newly received ATM cell of said bandwidth-guaranteed connection call when the number of the stored cells is equal to said queue length.

9. An ATM exchange for transmitting ATM cells which arrive from an input link to an output link, comprising:

a queuing buffer for storing in a queue received cells in correspondence with output link and serially transmitting the queued cells to the corresponding output link; and a congestion/normal state monitoring means for detecting the occurrence of a long-term congestion which is different from a short-term congestion caused by simultaneous arrival of cells in a normal state, and judging whether or not a normal state is restored from said long-term congestion under congestion avoiding control; wherein said congestion/normal state monitoring means setting in advance a queue length which is regarded as the occurrence of said long-term congestion, in said queuing buffer and comparing the actual queue length with said queue length so as to detect the occurrence of said long-term congestion.

10. An ATM exchange for transmitting ATM cells which arrive from an input link to a predetermined output link, comprising:

a queuing buffer for storing in a queue received cells in correspondence with output link and serially transmitting the queued cells to the corresponding output link; and a congestion/normal state monitoring means for detecting the occurrence of a long-term congestion which is different from a short-term congestion caused by simultaneous arrival of cells in a normal state, and judging whether or not a normal state is restored from said long-term congestion under congestion avoiding control;

wherein said congestion/normal state monitoring means setting in advance a queue length which is regarded as the occurrence of said long-term congestion, in said queuing buffer and comparing the actual queue length with said queue length so as to detect the occurrence of said long-term congestion;

wherein said congestion/normal state monitoring means includes:

means for setting a threshold $X_{ON}$ which represents the occurrence of said long-term congestion and a threshold $X_{OFF}$ ($X_{ON} > X_{OFF}$) which represents the restoration of a normal state from said long-term congestion;

a means for observing said queue length of said buffer; and a judging means for judging the fact that the observed value of said queue length at every predetermined observation time $T_{01}$ consecutively exceeds said threshold $X_{ON}$ a predetermined number $N_{01}$ ($N_{01} \geq 1$) of times to be the occurrence of said long-term congestion, while judging the fact that the observed value of said queue length at every predetermined observation time $T_{02}$ under congestion avoiding control is consecutively below said threshold $X_{OFF}$ a predetermined number $N_{02}$ ($N_{02} \geq 1$) of times to be the restoration to a normal state.

11. An ATM exchange for transmitting ATM cells which arrive from an input link to a predetermined output link, comprising:

a queuing buffer for storing in a queue received cells in correspondence with output link and serially transmitting the queued cells to the corresponding output link; and a congestion/normal state monitoring means for detecting the occurrence of a long-term congestion which is different from a short-term congestion caused by simultaneous arrival of cells in a normal state, and judging whether or not a normal state is restored from said long-term congestion under congestion avoiding control;

wherein said congestion/normal state monitoring means setting in advance a queue length which is regarded as the occurrence of said long-term congestion, in said queuing buffer and comparing the actual queue length with said queue length so as to detect the occurrence of said long-term congestion;

wherein said congestion/normal state monitoring means includes:

a means for setting a threshold $X_{ON}$ which represents the occurrence of said long-term congestion and a threshold $X_{OFF}$ ($X_{ON} > X_{OFF}$) which represents the restoration of a normal state from said long-term congestion;

a means for observing the maximum queue length of said buffer in every predetermined observation time; and a means for judging the fact that the maximum queue length of said buffer in every predetermined observation time $T_{01}$ consecutively exceeds said threshold $X_{ON}$ a predetermined number $N_{01}$ ($N_{01} \geq 1$) of times to be the occurrence of said long-term congestion, while judging the fact that the maximum queue length at every predetermined observation time $T_{02}$ under congestion avoiding control is consecutively below said threshold $X_{OFF}$ a predetermined number $N_{02}$ ($N_{02} \geq 1$) of times to be the restoration to a normal state.

12. An ATM exchange according to claim 9, wherein no control for ending said congestion avoiding control is executed for a predetermined time $T_{CTRL}$ after the start of said congestion avoiding control.

13. An ATM exchange for transmitting ATM cells of first type call and ATM cells of second type call which arrive from input links to an output link, comprising:

an ATM cell storing means for storing the ATM cells which arrive from the input links;

a transmission time storing means for storing transmission time at which the ATM cells of the first type call are transmitted to the output link so as to guarantee a bandwidth which the first type call requires;

a first cell transmission means for transmitting the ATM cells of the first type call stored in the ATM cell storing means to the output link in accordance with the stored transmission time; and a second cell transmission means for transmitting the ATM cells of the second type call stored in the ATM cell storing means to the output link at the different transmission time from the stored transmission time.

* * * * *